(12) United States Patent
Shima et al.

(10) Patent No.: US 7,865,832 B2
(45) Date of Patent: *Jan. 4, 2011

(54) EXTENDED ELEMENTS AND MECHANISMS FOR DISPLAYING A RICH GRAPHICAL USER INTERFACE IN PANEL SUBUNIT

(75) Inventors: Hisato Shima, Tokyo (JP); Atsushi Suzuki, San Diego, CA (US); Takuya Nishimura, Kanagawa-ken (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 2140 days.

This patent is subject to a terminal disclaimer.

(21) Appl. No.: 10/409,297

(22) Filed: Apr. 7, 2003

(65) Prior Publication Data

US 2003/0231205 A1 Dec. 18, 2003

Related U.S. Application Data

(63) Continuation of application No. 09/585,889, filed on May 31, 2000, now Pat. No. 6,556,221.

(51) Int. Cl.
G06F 17/00 (2006.01)
G06F 3/048 (2006.01)
G06F 3/00 (2006.01)

(52) U.S. Cl. .............. 715/721; 715/227; 715/767; 715/771; 715/823; 715/840; 715/764; 715/716; 725/39

(58) Field of Classification Search ............ 715/767, 715/823, 840, 227, 764, 771, 721, 716, 719; 725/39

See application file for complete search history.

(56) References Cited

U.S. PATENT DOCUMENTS

| 5,121,477 | A | 6/1992 | Koopmans et al. |
| 5,517,257 | A | 5/1996 | Dunn et al. |
| 5,606,664 | A | 2/1997 | Brown et al. |
| 5,657,221 | A | 8/1997 | Warman et al. |

(Continued)

FOREIGN PATENT DOCUMENTS

EP  0596594  5/1994

(Continued)

*Primary Examiner*—Tadeese Hailu
*Assistant Examiner*—Nicholas S Ulrich

(57) ABSTRACT

Methods for realizing advanced graphical user interface (GUI) in panel subunit. The present invention provides, in one embodiment, a button GUI element descriptor that defines a bitmap to be displayed when a button is out of focus and another bitmap to be displayed when the button is in focus. In another embodiment, the present invention provides a table GUI element descriptor that defines a table-like on screen display to be displayed on the contoller device. Another embodiment of the present invention provides a panel GUI element descriptor that includes a focused identifier attribute indicating a pre-determined element of the on-screen display as default focus. In this way, the target device would be able to control the default focus of the controller device when displaying an on-screen display. In yet another embodiment, the present invention provides a text GUI element descriptor that includes a font style attribute that dictates whether the text GUI element should be displayed as bold, underlined and/or reversed. By using these extended elements in panel subunit, more complicated and advanced GUI, such as an electronic programming guide (EPG) can be achieved.

8 Claims, 33 Drawing Sheets

U.S. PATENT DOCUMENTS

| | | | |
|---|---|---|---|
| 5,666,498 A | | 9/1997 | Amro |
| 5,673,401 A | * | 9/1997 | Volk et al. .................. 725/139 |
| 5,721,849 A | | 2/1998 | Amro |
| 5,734,363 A | | 3/1998 | Blouin et al. |
| 5,831,664 A | * | 11/1998 | Wharton et al. ............... 725/81 |
| 5,956,025 A | | 9/1999 | Goulden et al. |
| 5,956,049 A | | 9/1999 | Cheng |
| 6,020,881 A | * | 2/2000 | Naughton et al. ........... 715/740 |
| 6,039,047 A | * | 3/2000 | Rock et al. .................. 128/897 |
| 6,133,938 A | * | 10/2000 | James ......................... 725/80 |
| 6,137,487 A | * | 10/2000 | Mantha ....................... 715/767 |
| 6,148,241 A | | 11/2000 | Ludtke et al. |
| 6,211,856 B1 | * | 4/2001 | Choi et al. .................. 345/666 |
| 6,271,893 B1 | * | 8/2001 | Kawaguchi et al. ......... 348/725 |
| 6,295,479 B1 | | 9/2001 | Shima et al. |
| 6,437,836 B1 | * | 8/2002 | Huang et al. ................ 348/734 |
| 6,449,514 B1 | | 9/2002 | Natsubori et al. |
| 6,892,360 B1 | * | 5/2005 | Pabla et al. .................. 715/802 |

FOREIGN PATENT DOCUMENTS

| | | |
|---|---|---|
| EP | 0745929 | 12/1996 |
| WO | 9614618 | 5/1996 |

* cited by examiner

382

| |
|---|
| CONTROL TYPE = LCD PANEL<br>440 |
| CONTROL IMAGE = [442a]    442 |
| CONTROL SIZE (IN X AND Y DIMENSIONS)<br>444 |
| GROUP IDENTIFICATION<br>446 |
| CONTROL POSITION IN GROUP : [448b / 448a]    448 |
| VALUE RANGE SPECIFICATION:<br><CHARACTER AND ICON SET(S) SUPPORTED BY THIS DISPLAY><br>450 |
| AV/C COMMAND =<br>FF    (NO COMMAND)<br>452 |
| TARGET SUBUNIT =<br>FF    (NO SUBUNIT)<br>454 |
| NAME = NIL<br>456 |
| HELP STRING = NIL<br>458 |

| CONTROL TYPE = BUTTON |
| --- |
| 460 |

| CONTROL IMAGES = | | |
| --- | --- | --- |
| PRESSED = | ◿ — 462a | |
| RELEASED = | ◺ — 462b | 462 |

| CONTROL SIZE (IN X AND Y DIMENSIONS) |
| --- |
| 464 |

| GROUP IDENTIFICATION |
| --- |
| 466 |

| CONTROL POSITION IN GROUP : — 468b |
| --- |
| ▫ ▫ [ 468a ] ▫ ▫ |
| 468 |

| VALUE RANGE SPECIFICATION: |
| --- |
| <INTEGER, 0, 1> |
| 470 |

| AV/C COMMAND = |
| --- |
| $C3_{16}$ (PLAY)  472 |

| TARGET SUBUNIT = |
| --- |
| (VCR SUBUNIT TYPE AND ID) |
| 474 |

| NAME = "PLAY" |
| --- |
| 476 |

| HELP STRING = NIL |
| --- |
| 478 |

| ADDRESS | TABLE GUI ELEMENT | |
|---|---|---|
| | CONTENTS | |
| 00 00h | desciptor_length | 1502 |
| 00 01h | | |
| 00 02h | list_type(FFh) | 1504 |
| 00 03h | attributes(00h) | 1506 |
| 00 04h | size_of_list_specific_information | 1508 |
| 00 05h | | |
| 00 06h | content_width | 1510 |
| 00 07h | | |
| 00 08h | content_height | 1512 |
| 00 09h | | |
| 00 0Ah | number_of_x_item | 1514 |
| ⋮ | number_of_y_item | 1516 |
| ⋮ | start_item_of_display(x) | 1518 |
| ⋮ | start_item_of_display(y) | 1520 |
| ⋮ | display_range(x) | 1522 |
| ⋮ | display_range(y) | 1524 |
| ⋮ | selectable | 1526 |
| ⋮ | optional_attributes_list | 1528 |
| ⋮ | number_of_links(n) | 1530 |
| ⋮ | released_label_link | 1532 |

FIGURE 15

1500cont.

| 1626 *LAW & ORDER* | HIGHLANDER — 1624 |
| WCW WRESTLING | THE JERK |
| NATL GEO EXPLORER | AMERICAN... |
| LARRY KING LIVE | CROSSFIRE |
| TOMMY BOY | MAJOR... |

| 1628 BAYWATCH | HOWARD STERN |
| LAW & ORDER | HIGHLANDER |
| WCW WRESTLING | THE JERK |
| NATL GEO EXPLORER | AMERICAN... |
| LARRY KING | CROSSFIRE |

FIGURE 17B

| ADDRESS | BUTTON GUI ELEMENT CONTENT | |
|---|---|---|
| 00 00h | desciptor_length | 1902 |
| 00 01h | | |
| 00 02h | list_type(FFh) | 1904 |
| 00 03h | attributes(00h) | 1906 |
| 00 04h | size_of_list_specific_information | 1908 |
| 00 05h | | |
| 00 06h | button_width | 1910 |
| 00 07h | | |
| 00 08h | button_height | 1912 |
| 00 09h | | |
| 00 0Ah ⋮ | optional_attributes_list | 1914 |
| ⋮ | number_of_links (n) | 1916 |
| ⋮ | normal_label_link | 1918 |
| ⋮ | normal_bitmap_link | 1920 |
| ⋮ | focused_label_link | 1922 |
| ⋮ | focused_bitmap_link | 1924 |
| ⋮ | optional_link_list | 1926 |

| ADDRESS | PANEL GUI ELEMENT | |
|---|---|---|
| | CONTENT | |
| 00 00h | desciptor_length | 2102 |
| 00 01h | | |
| 00 02h | list_type(FFh) | 2104 |
| 00 03h | attributes(00h) | 2106 |
| 00 04h | size_of_list_specific_information | 2108 |
| 00 05h | | |
| 00 06h | aspect_ratio | 2110 |
| 00 07h | focused_id | 2112 |
| 00 08h | optional_attributes_list | 2114 |
| 00 09h | | |
| 00 0Ah | | |
| : | number_of_links(n) | 2116 |
| : | . | |
| : | . | |
| : | . | |

| TEXT GUI ELEMENT ||
|---|---|
| ADDRESS | CONTENT |
| 00 00h | desciptor_length |
| 00 01h | |
| 00 02h | list_type(FFh) |
| 00 03h | attributes(00h) |
| 00 04h | size_of_list_specific_information |
| 00 05h | |
| 00 06h | text_height |
| 00 07h | |
| 00 08h | text_width |
| 00 09h | |
| 00 0Ah | selectable |
| : | bold |
| : | underline |
| : | reverse |
| : | |
| : | optional_attributes_list |
| : | |
| : | number_of_links(n) |
| : | |
| : | . . . |
| : | |

EXTENDED ELEMENTS AND MECHANISMS FOR DISPLAYING A RICH GRAPHICAL USER INTERFACE IN PANEL SUBUNIT

This application is a continuation of and claims the benefit of application(s) application Ser. No. 09/585,889 filed on May 31, 2000 now U.S. Pat. No. 6,556,221 and which designated in the U.S.

BACKGROUND OF THE INVENTION

1. Field of the Invention

The present invention relates to the field of consumer electronic devices. More specifically, the present invention relates to methods and systems for providing user interfaces for networked electronic devices including remote devices.

2. Related Art

The typical home entertainment system today consists of a variety of different consumer electronic devices which present and record audio/visual media in different ways. In the field of media devices, there is a spectrum of features for products of a given class (VCRs, video camera, etc.). Most of the features are represented by physical controls or elements on a control panel on the device which can be manipulated by a human user.

Recently, a class of consumer electronic media devices has been introduced that can be networked together using a standard communication protocol layer (e.g., IEEE 1394 communication standard). The IEEE 1394 standard is an international standard for implementing an inexpensive high-speed serial bus architecture which supports both asynchronous and isochronous format data transfers. The IEEE 1394 standard provides a high-speed serial bus for interconnecting digital devices thereby providing universal input/output connection. The IEEE 1394 standard defines a digital interface for applications thereby eliminating the need for an application to covert digital data to an analog form before it is transmitted across the bus. Correspondingly, a receiving application will receive digital data from the bus, not analog data and will therefore not be required to convert analog data to digital form. The IEEE 1394 is ideal for consumer electronics communication in part because devices can be added to or removed from the serial bus while the bus is active. If a device is so added or removed, the bus automatically reconfigures itself for transmitting data between the then existing devices. Each device on the bus is a "node" and contains its own address space.

The provision of the IEEE 1394 serial communication bus for networking consumer electronic devices has introduced a powerful new platform on which device functionality and inter-operability can be built. For instance, in such a system, complex operations involving media transfers, media recordings and media presentation can be performed that involve two or more devices acting in concert. However, interaction between these devices can be complex, error prone and laborious if it is required that each device be directly touched in order to properly configure the desired operation. The problems associated with properly configuring the media operation can be exacerbated if one or more of the devices are remotely located and/or need constant attention and or adjustment. What is needed is an effective mechanism for interfacing with networked consumer electronic devices to facilitate media operations between two or more devices.

In addition, it is often desired to provide remote control access to the features performed by a consumer electronic device so that these devices can be accessed from a central location within a home or office. However, not all consumer electronic devices are able to provide a sophisticated display system for remote interaction, e.g., some devices offer only a small liquid crystal display (LCD) or a small collection of light emitting diodes (LEDs) as display devices. What is needed is a mechanism for interfacing remotely with devices that provides a sophisticated level of user interaction for many devices. What is needed further is a mechanism for interfacing with electronic devices that is flexible and can adapt to new devices and device types within the consumer electronics market.

SUMMARY OF THE DISCLOSURE

Accordingly, the present invention provides an effective mechanism for interfacing with networked consumer electronic devices to facilitate media operations between two ore more devices. The present invention also provides a mechanism for enabling the realization of complicated graphical user interfaces (GUIs), e.g., electronic programming guide (EPG), in a controller device. In addition, the present invention provides a mechanism whereby the target device can enforce certain "look-and-feel" of the graphical user interface displayed by the controller device. Specifically, the present invention provides a number of extended elements and mechanisms for panel subunit for accomplishing these goals.

Table GUI Element

The present invention also provides, in one embodiment, a table GUI element descriptor that defines a table-like on-screen display to be displayed on the controller device. Significantly, the table GUI element descriptor of the present embodiment enables the target device to enforce a particular arrangement of GUI elements displayed by the controller. In addition, the table GUI element descriptor of the present embodiment allows the target device to indicate particular cells of a large table to be displayed. In this way, controller devices with limited capabilities and memory capacities can be used to display a large amount of information one page at a time. The table GUI element descriptor of the present invention further defines the layout of the table, i.e., the size, the number of columns and rows to be displayed, etc.

Embodiments of the present invention also include a method for realizing complex graphical user interface (GUI) in a network having a controller device and a target device. The method includes the steps of: (1) the controller device receiving a table GUI element descriptor from the target device, wherein the table GUI element descriptor defines a matrix that includes vertically and horizontally aligned information, and wherein the table GUI element descriptor further defines an on-screen display for displaying a portion of the matrix; and (2) the controller device displaying the on-screen display according to the table GUI element descriptor.

Focused Bitmap

The present invention provides, in another embodiment, a button GUI element descriptor that defines the appearance of a button element when displayed by a controller. Significantly, the button GUI element descriptor defines one bitmap to be displayed when the button element is out of focus and another bitmap to be displayed when the button element is in focus. In this way, the target would be able to control the focused design of the button.

Embodiments of the present invention include a method for realizing complex graphical user interface (GUI) in a system having a controller device and a target device. The method includes the steps of: (1) the controller device receiving a button GUI element descriptor from the target device, wherein the button GUI element descriptor defines a button element to be displayed and wherein the button GUI element descriptor further defines a first bitmap image to be displayed when the button element is out of focus and a second bitmap image to be displayed when the button element is in focus; and (2) the controller device displaying said button element as part of an on-screen display, wherein the controller device displays the first bitmap image when the button element is out of focus and wherein the controller device displays the second bitmap image when the button element is in focus.

Default Focus

Another embodiment of the present invention provides a panel GUI element descriptor that includes a focused identifier attribute indicating a pre-determined element of the on-screen display as default focus. In this way, the target device would be able to control the default focus of the controller device when displaying an on-screen display.

Embodiments of the present invention include a method for realizing complex graphical user interface (GUI) in a network having a controller device and a target device. The method includes the steps of: (1) the controller device receiving a panel GUI element descriptor from the target device, wherein the panel GUI element descriptor defines an on-screen display that includes a plurality of elements, and wherein the panel GUI element descriptor further includes a focused identifier attribute that indicates a pre-determined one of the plurality of elements as default focus; (2) the controller device displaying the on-screen display according to the panel GUI element descriptor; and (3) the controller device choosing the pre-determined element as focus.

Font Style Attributes for Text Element

Yet another embodiment of the present invention provides a text GUI element descriptor that includes a font style attribute dictating whether the text GUI element should be displayed as bold, underlined and/or reversed. In this way, the target device would be able to exercise more control over the "look-and-feel" of the GUI as displayed by the controller device such that more sophisticated GUIs can be realized.

Embodiments of the present invention also include a method for realizing complex graphical user interface (GUI) in a network having a controller device and a target device, the method comprising steps of: (1) the controller device receiving from a text GUI element descriptor from the target device, wherein the text GUI element descriptor defines a text element to be displayed and wherein the text GUI element descriptor further includes a font style attribute; and (2) the controller device displaying the text element according to the font style attribute.

Panel Subunit

Embodiments of the present invention are implemented within a network of electronic devices, e.g., digital television (DTV), set-top box (STB), video cassette recorder, compact disk device, personal computer systems, etc., that are coupled together using a standard communication protocol layer, e.g., the IEEE 1394 serial communication standard. The present invention utilizes a panel subunit to allow any compliant device (e.g., a target device) to describe the physical appearance of its controls and displays (e.g., elements) to another device (e.g., an intelligent controller) and allows the intelligent controller to trigger actions on the target device as if a user had physically manipulated the controls on the target device directly. An intelligent controller (e.g., a TV or set-top-box or both) monitors the network to discover the units coupled thereto and is programmed to locate panel subunits that are defined for a target device. The target device may be remotely located.

In general, the panel subunit then provides the intelligent controller with information for rendering a depiction of the controls and displays of the target device and this depiction can be interacted with by a user for remotely triggering actions by the target device. The panel subunit is defined such that command interpretations and image alterations are controlled by the target device thereby reducing the responsibility of the intelligent controller in managing the user interface with generic user events.

The panel subunit uses control objects stored in an object descriptor list to define the physical controls of the target device. The control objects are defined with several standard types of controls and displays (e.g., push buttons, sliders, dials, LCD screens, etc.) that are commonly found on consumer electronic devices. The control types have well defined behaviors (e.g., buttons are pushed, dials are moved, values are input, etc.). In addition, the panel subunit defines a set of commands which are to be applied to any of these controls when selected by the user. The commands are defined to be sufficiently generic so that they apply to most types of controls. The panel subunit also defines generic user interaction commands (or user events) which can be applied to the controls (e.g., press, press and hold, release, input value, etc.) by a user. The purpose of these generic user events is to encapsulate the typical user manipulated action for the controls and to let the target device decide the manner in which to interpret the user actions on its own thereby relieving the intelligent controller of these responsibilities.

A status descriptor of the panel subunit keeps the intelligent controller informed of the status of the target device being manipulated. The status descriptor data structure is dynamic and is maintained up to date by the panel subunit. The intelligent controller examines the status descriptor to update its graphical display to indicate the target device status to the user. A panel status notification command allows the intelligent controller to post a notification request to the target device to indicate when any changes in the state of the target device result in a change in the status descriptor. Related controls of a target device can be grouped together into local groups which the panel subunit allows to be displayed or processed together in special ways.

BRIEF DESCRIPTION OF THE DRAWINGS

FIG. 7A and FIG. 7B illustrate exemplary control object descriptors in accordance with the panel subunit of the present invention.

FIGS. 17A and 17B depict exemplary EPG tables displayed by a controller device in accordance with an embodiment of the present invention.

FIG. 19 illustrates a particular implementation of a button GUI element descriptor.

FIG. 21 illustrates a particular implementation of a panel GUI element descriptor in accordance with one embodiment of the present invention.

FIG. 23 illustrates a particular implementation of a text GUI element descriptor according to one embodiment of the present invention.

DETAILED DESCRIPTION OF THE PREFERRED EMBODIMENTS

Figure 1:
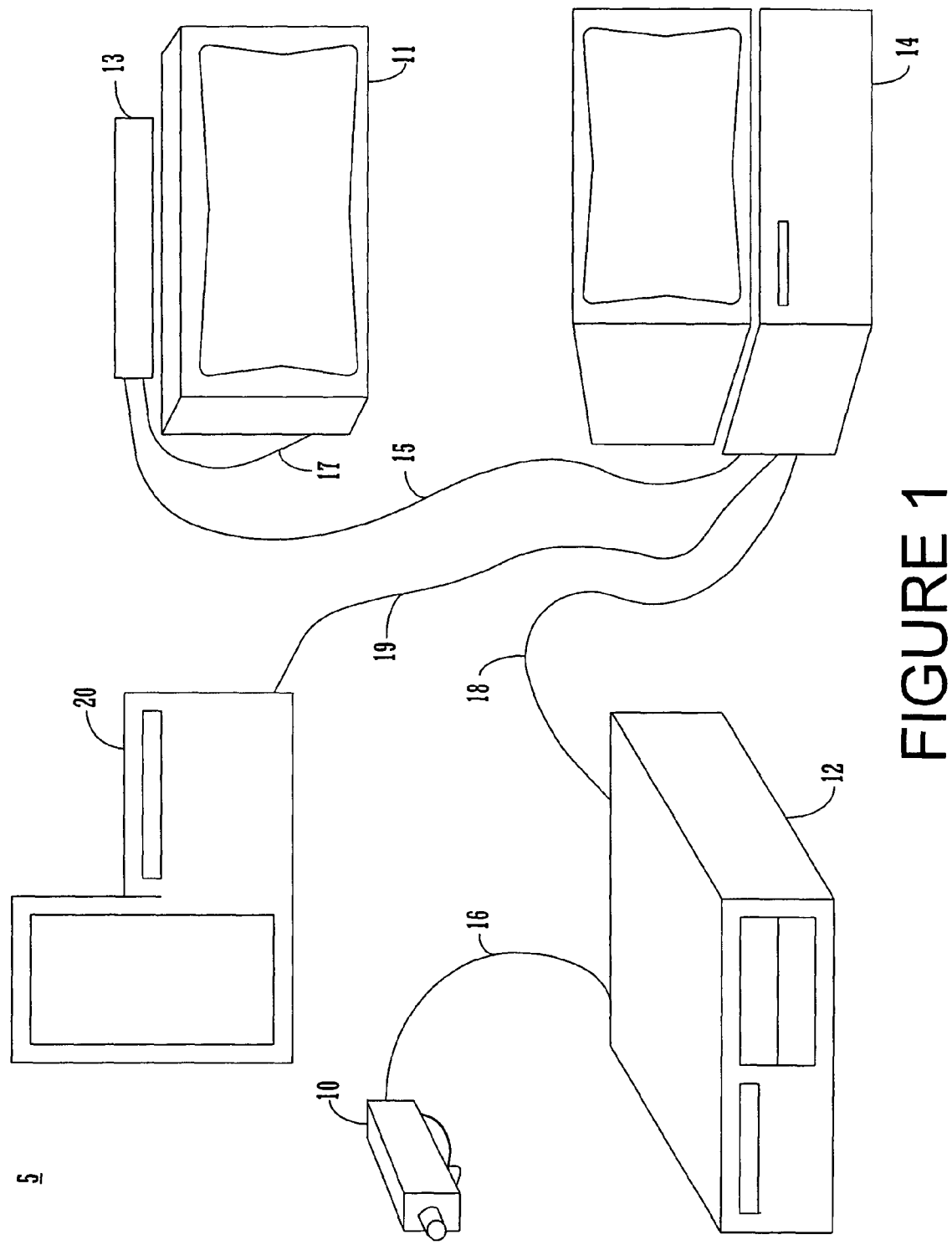
FIG. 1 illustrates an exemplary networked system of electronic devices including a video camera, a video cassette recorder, a computer, a set-top-box, a television and a compact disk changer.

In the following detailed description of the present invention, command pass through mechanism for use with a panel subunit for remotely interfacing with a target device via an intelligent controller within a network of consumer electronic devices, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Embodiments of the present invention are drawn to a panel subunit that allows any compliant device (e.g., "target device") to describe its physical appearance including controls and displays, etc., to an outside intelligent controller device. The target device can be remote to the intelligent controller. The intelligent controller then generates a user interface for the target device including: 1) interactive controls; and 2) user display information pertinent to the target device. The panel subunit allows the intelligent controller to trigger actions on the target device as if a user had physically manipulated the controls of the target device. The intelligent controller and the target device are connected to the same communication network (e.g., using the IEEE 1394 serial standard). The present invention can also be used in one embodiment to promote high levels of inter-operability between any of the devices which support the well known AV/C command and control protocol.

Generally, the present invention allows an intelligent controller to communicate with the panel subunit of the target device and inquire about the various types of controls which it has, e.g., buttons, sliders, etc. The intelligent controller then generates, on its display, a human interface based on these control object descriptions, and when the user manipulates this human interface, the controller sends special user events to the target device. The information that is capable of being displayed by the intelligent controller can be made scaleable by the target device so that the human interface displayed can adapt to the particular display capabilities of the intelligent controller device. The intelligent controller monitors the target device to maintain the most current status presented to the user.

Thus, the intelligent controller does not need to have advance knowledge of any specific features in the target device or how they are used or invoked because this functionality is the responsibility of the target device. All issues such as state transitions and inter-control dependencies are handled automatically the by target device independently of the intelligent controller responsibility. The present invention removes all requirements for items such as state transition tables and their execution environment, because it takes advantage of the functionality that is already built into a media device and used to handle the physical buttons as they are manipulated by the user. For instance, when the intelligent controller asks the target to "simulate the press of button 5," the intelligent controller does not need to have any knowledge at all about what is happening within the target device upon being notified of the user action. The state transition logic for what happens when "button 5" is pressed is all contained within the target device. This is advantageous because it enhances the inter-operability between the intelligent controller and the target device while at the same time greatly reduces the responsibilities of each.

In addition to describing physical controls and appearances, the present invention can be used to describe logical controls and appearances of elements of a logical control panel. For instance, a logical control panel can be used to control a "black box" not having any physical controls but having only a 1394 connector with the black box being located in a closet or other remote location. In this case, the black box is manipulated with on screen controls via its panel subunit thereby having no physical control panel itself.

Network Environment of the Present Invention

FIG. 1 illustrates an exemplary network system 5 that can support the embodiments of the panel subunit of the present invention. Exemplary system 5 includes consumer electronic devices (including computer systems) as nodes but could be extended equally well to cover other electronic devices. System 5 includes a video camera 10, a video cassette recorder (VCR) 12, a computer system 14, a set-top-box (STB) 13, a television set (TV) 11 and a compact disk (CD) changer 20 connected together with the network by IEEE 1394-1995 (IEEE 1394) cables 15, 16, 18 and 19. It is appreciated that the panel subunit embodiments of the present invention are equally well suited for application with any bus structure and the IEEE 1394 bus structure is shown and described herein as an example bus architecture only. The STB 13 can be coupled to receive media from a cable TV system. The IEEE 1394 cable 16 couples the video camera 10 to the VCR 12 allowing the video camera 10 to send data, commands and parameters to the VCR 12 for recording (or to any other device of the network 5). The IEEE 1394 cable 18 couples the VCR 12 to the computer system 14 allowing the VCR 12 to send data, commands and parameters to the computer system 14 for display (or to any other device of the network 5).

The IEEE 1394 cable 15 couples the STB 13 to the computer system 14. The STB 13 is also coupled to the TV 11 by the cable 17. The CD changer 20 is coupled to the computer system 14 by the IEEE 1394 cable 19. The configuration 5 illustrated in FIG. 1 is exemplary only and it should be apparent that an audio/video network in accordance with the present invention could include many different combinations of components. The devices within an IEEE 1394 network 5 are autonomous devices, meaning that in an IEEE 1394 network, in which a computer is one of the devices, there is no true master-slave relationship between the computer system 14 and the other devices. In fact, as described below in an exemplary embodiment of the panel subunit of the present invention, the intelligent controller is the STB 13. In many IEEE 1394 network configurations, a computer system 14 may not be present. Even in such configurations, the devices within the network are fully capable of interacting with each other on a peer-to-peer basis. It should be recognized that data, commands and parameters can be sent between all of the devices within the IEEE 1394 network 5.

The IEEE 1394 serial bus used by system 5 of FIG. 1 is a high-speed bus architecture for interconnecting digital devices thereby providing a universal input/output connection. The IEEE 1394 standard defines a digital interface for the applications thereby eliminating the need for an application to covert digital data to analog data before it is transmitted across the bus. Correspondingly, a receiving application receives digital data from the bus, not analog data, and therefore is not required to covert analog data to digital data. The cable required by the IEEE 1394 standard is very thin in size compared to other bulkier cables used to connect such devices. Devices can be added and removed from an IEEE 1394 bus while the bus is active. If a device is so added or removed, the bus automatically reconfigures itself for transmitting data between the then existing nodes. A node is considered a logical entity having a unique address on the bus structure. Each node provides an identification ROM, a standardized set of control registers and its own address space.

The IEEE 1394 communication standard within system 5 of FIG. 1 supports isochronous data transfers of digital encoded information. Isochronous data transfers are real-time transfers which take place such that the time intervals between significant instances have the same duration at both the transmitting and receiving applications. Each packet of data transferred isochronously is transferred in its own time period. An example of an application for the transfer of data isochronously is from a VCR 12 to TV 11 of FIG. 1. The VCR 12 records images and sounds and saves the data in discrete packets. The VCR 12 then transfers each packet, representing the images and sounds recorded over a limited time period, during that time period, for display by the TV 11. The IEEE 1394 standard bus architecture provides multiple channels for isochronous data transfers between applications. Specifically, a six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

Intelligent Controller

User interface aspects of the panel subunit of the present invention are implemented within an intelligent controller device. The intelligent controller can be any device coupled within a networked system (e.g., system 5 of FIG. 1) designated by the user and having certain basic input functionality and basic display capability. In one embodiment of the present invention, the STB 13 and the TV 11 act as the intelligent controller. In other embodiments, the computer system 14 can act as the intelligent controller or the TV 11 can act alone as an intelligent controller. Any device having "display" and input capability can act as the intelligent controller, e.g., a personal digital assistant (PDA), a hand-held electronic device, a cell phone, etc.). Within the context of the present invention, the intelligent controller is the device that provides a user interface for controlling events on another, remote, target device within the network 5. To this extent, the intelligent controller communicates with a display device and an information input device. The display and input capabilities of the intelligent controller device define the type of user interface that the intelligent controller can provide to a user and the panel subunit of the present invention allows the definition of scaleable user interface capabilities.

Figure 2:
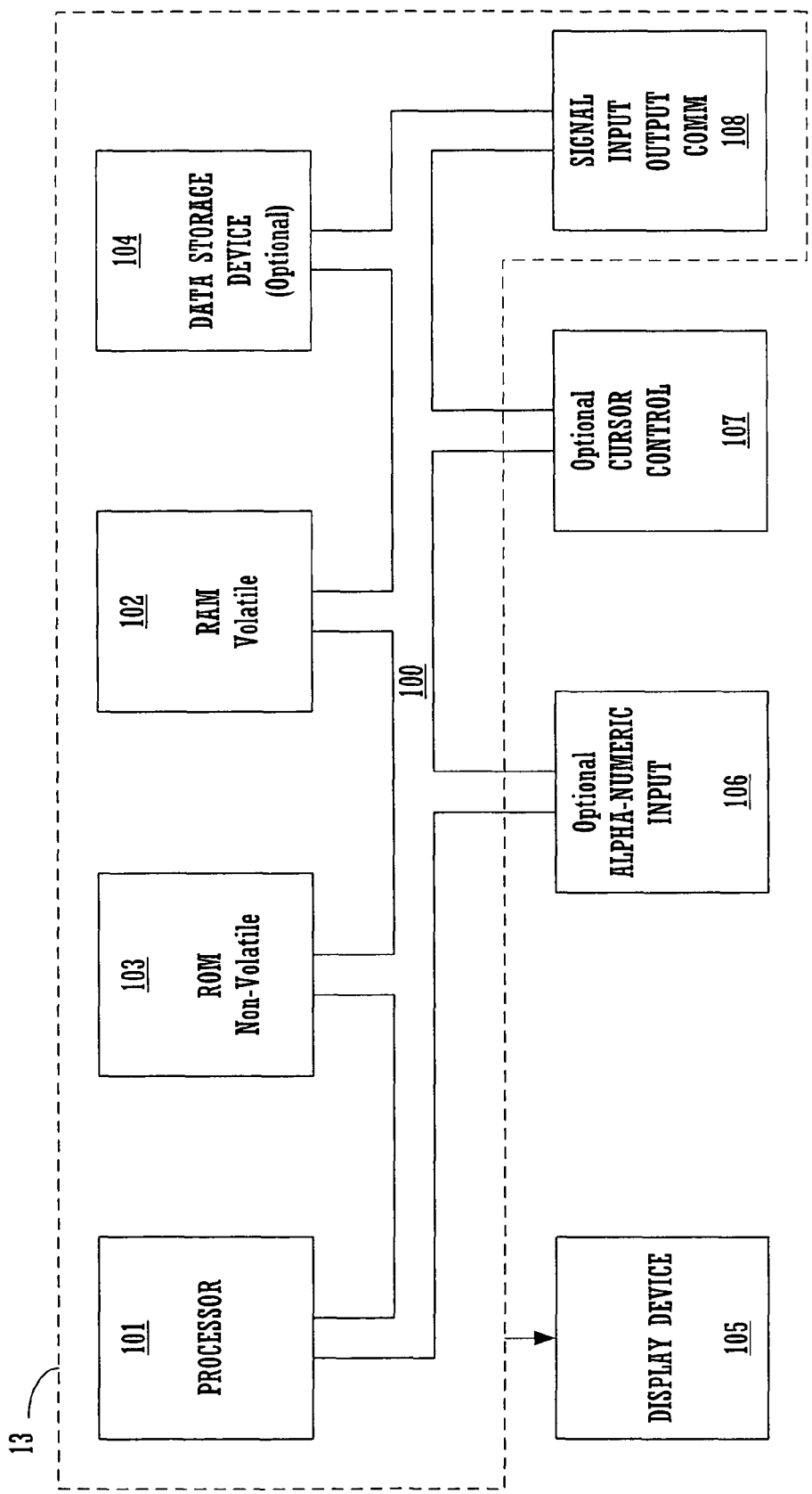
FIG. 2 illustrates components of an intelligent controller in accordance with the present invention.

FIG. 2 illustrates the components of the intelligent controller, and in this example it is the STB 13. STB 13 includes an address/data bus 100 for communicating information, a central processor 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. STB 13 can also optionally include a data storage device 104 ("disk subsystem") such as a magnetic or optical disk and disk drive coupled with the bus 100 for storing information and instructions. In one embodiment, the display device 105 can be part of the intelligent controller. As shown in FIG. 2, the display device (e.g., TV 11) is external to the STB 13. When incorporated into the intelligent controller, the display device 105 can be a display screen (e.g., flat panel or CRT, etc.) or it can be a liquid crystal display (LCD) panel or other suitable display device for the display of alphanumeric and/or graphic information.

The intelligent controller 13 also interfaces with or includes one or more user input devices. In one embodiment, the input device can be an alphanumeric input device 106 including alphanumeric and function keys coupled to the bus 100 for communicating information and command selections to the central processor 101. Alternatively, or in addition, the intelligent controller 13 can interface with or include a cursor control or cursor directing device 107 coupled to the bus for communicating user input information and command selections to the central processor 101. The cursor directing device 107 can be implemented using a number of well known devices such as a mouse, a track ball, a track pad, an electronic pad and stylus, an optical tracking device, a touch screen etc. In addition, the user input device can also be a remote control device, e.g., a universal remote control device having a number of buttons, dials, etc., with an infra-red signal communication capability. STB 13 can also include a signal generating device 108 coupled to the bus 100 for interfacing with other networked devices over the IEEE 1394 bus.

The target device of the present invention can also include one or more components as described with respect to FIG. 2. Particularly, the target device in accordance with the present invention includes computer readable memory units which can include one or more ROM and/or RAM units for storing panel subunit information of the present invention which are described below.

Panel Subunit of the Present Invention

The present invention defines a subunit type called a "panel" subunit. The panel subunit is defined for a target device and outlines characteristics for generating a user interface on an intelligent controller device (e.g., STB 13) of a network system 5. The panel subunits can be defined for multiple target devices and therefore many panel subunits can be included within a network system 5. For a particular target device, its panel subunit can be stored as a data structure within computer readable memory units of the particular target device.

Figure 3A:
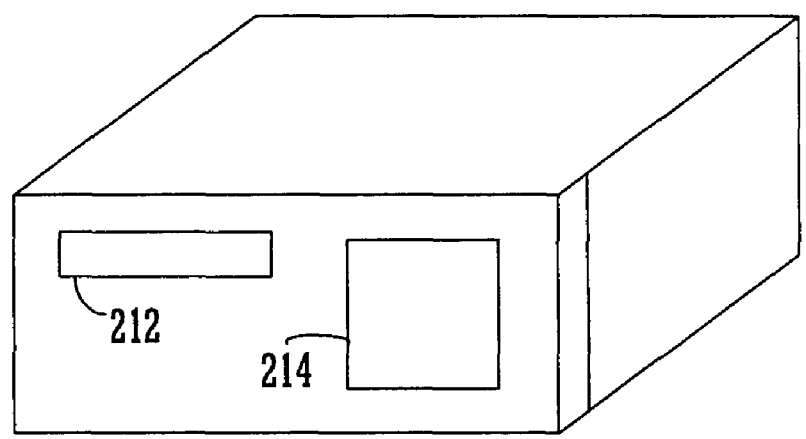
FIG. 3A is a perspective view of a target device having panel display elements and panel control elements.

FIG. 3A illustrates a perspective view of the VCR 12 of FIG. 1 as an exemplary target device. Although, generally, any electronic device can have its own panel subunit and thereby be a "target device," the following discussion illustrates an exemplary case where the VCR 12 is the target device. VCR 12 contains a video tape slot 212 for insertion and removal of video tape media. The VCR 12 also contains one or more liquid crystal displays (LCDs) 214.

Figure 3B:
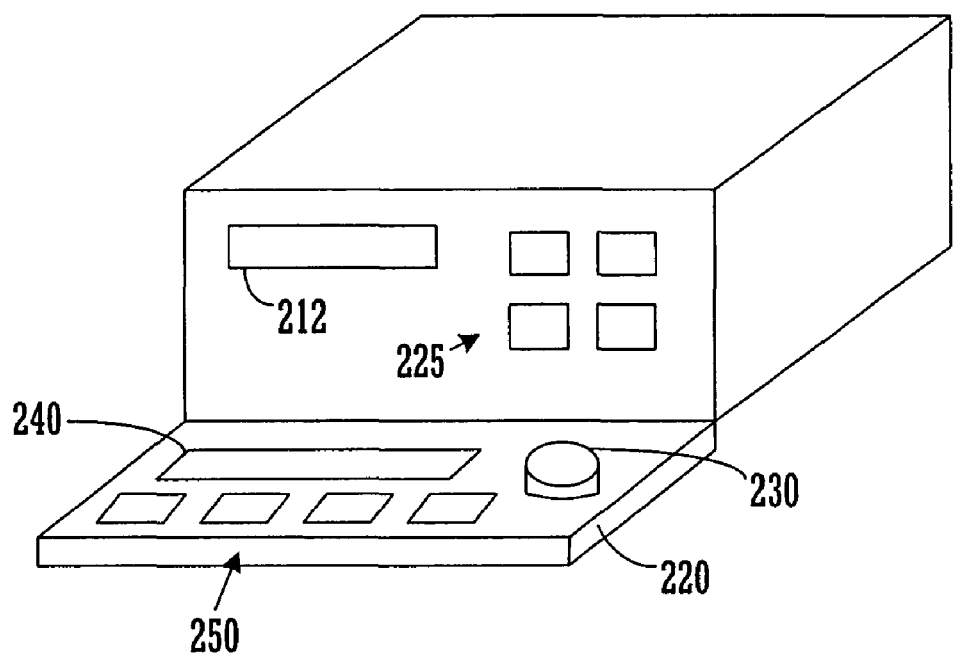
FIG. 3B is a perspective view of the target device of FIG. 3A having a front panel in the flipped-open state to expose more control and display elements.

FIG. 3B illustrates the VCR 12 with a control panel 220 flipped-down exposing certain controls and further displays (e.g., "elements"). The control panel 220 contains another LCD display 240 and includes a scrubber control 230 or "dial." The control panel 220 also contains certain tape transport controls 250 (including play, pause, stop, rewind, fast-forward, buttons etc.). When the control panel 220 is flipped down, it exposes tuner preset buttons 225. In the present invention, devices can have more than one logical control panel. In this configuration, the VCR 12 has two logical subpanels. The first subpanel includes the controls and display of the flip-down control panel 220 and the second subpanel includes the tape slot 212 and the tuner preset buttons 225. Another subpanel could define the LCD panel 214.

Figure 4:
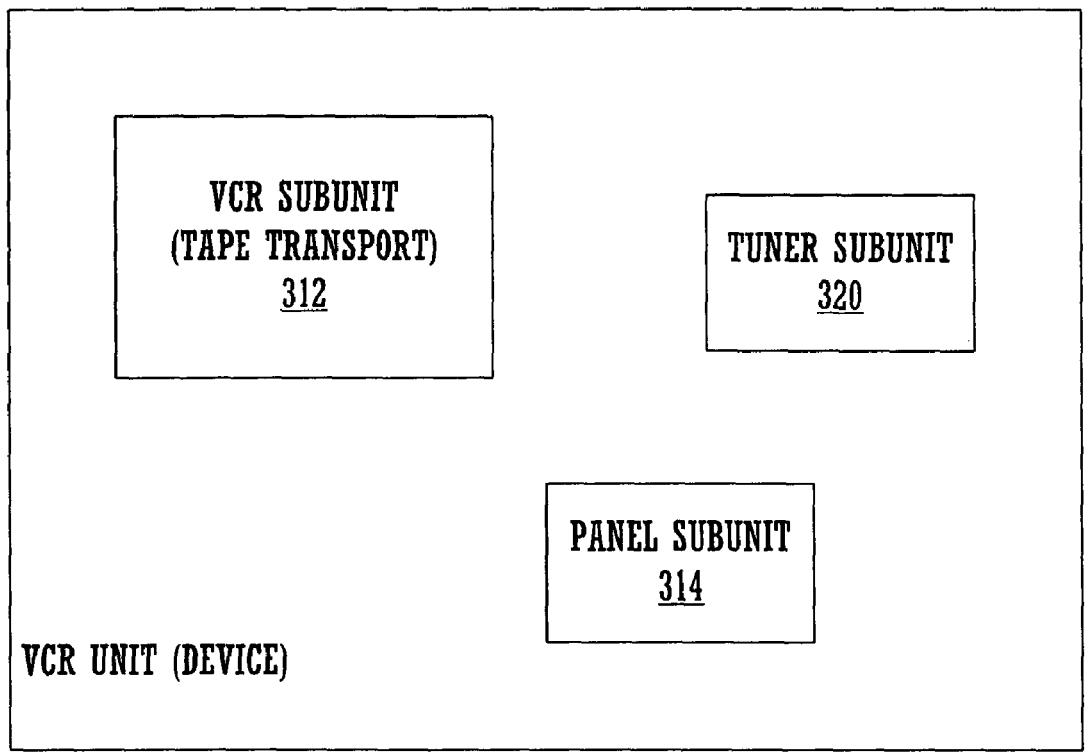
FIG. 4 illustrates a logical block diagram of the subunits located within a target device (a VCR) including the panel subunit of the present invention.

FIG. 4 illustrates a logical block diagram of some of the subunits that can be associated with VCR 12 in accordance with the present invention. Within the well known AV/C protocol, subunits are logical, not physical, groupings of functionality that can be individually addressed and controlled within a device. For example, a VCR device 12 can have two subunits, one subunit 312 for the actual VCR tape transport mechanism, and another subunit 320 for the tuning functionality. The panel subunit 314 of the present invention adds a novel logical subunit that can be associated with the VCR device 12. As described further below, the panel subunit 314 of the present invention is realized, in one embodiment, as one or more data structures stored in computer readable memory units of the target device e.g., the VCR unit 12. It is possible for a panel subunit for a first device (e.g., of limited memory capacity) to exist on a second device (having more memory), whereby the second device acts as a proxy for the first device's panel subunit.

The panel subunit 314 is a collection of data structures called "descriptors" that describe the physical controls on the target device (e.g., the control panel). In operation, the intelligent controller (e.g., STB 13) accesses the panel subunit 314 of the target device, and based thereon, implements a user interface for using the target device (e.g., the VCR 12). The user interface involves the display (e.g., TV 11) and user input devices associated with the intelligent controller, as described with respect to FIG. 2. The specification for the panel subunit 314 defines several standard types of controls and displays that are commonly found on consumer electronic devices, such as push buttons, sliders, dials, LCD screens, etc. As an example, the descriptions within the panel subunit 314 for VCR 12 could represent the buttons, dial and LCD screens of FIG. 3A and FIG. 3B.

The control types defined by the panel subunit 314 have well defined behaviors. For instance, buttons are pushed and released and typically have two values, sliders may have several discrete values or a continuous range of values. Further, some standard control types may be combined within the descriptors to form hybrid or custom controls. One example of this is a dial with a push button in the middle or a button with an LED in the middle. Such composite control mechanisms are supported by the panel subunit of the present invention. Finally, vendor specific custom controls may also be defined.

In addition to standard control types, the panel subunit 314 of the present invention also defines a set of commands which may be applied to any of these controls. The commands are defined to be sufficiently generic so that they apply to most types of controls. For example, issuing the command SET CONTROL VALUE (control 1, 6) by the intelligent controller may cause a volume slider to be set to the value 6, representing a change in volume. Likewise, the same command type with different operands can be issued as SET CONTROL VALUE (control 5, "please enter the track name"), and it would cause that text to show upon the LCD display of a MiniDisc recorder 20, prompting the user to enter a name for a track on the disc. Further, within the panel subunit, some commands can be specific to certain kinds of controls.

The panel subunit 314 also defines "user interaction commands" or user events which can be applied to the controls of the user interface. The purpose of these generic user events is to encapsulate the typical user manipulation actions for controls, and to let the target device interpret what it means when these user events occur thereby freeing the intelligent controller of this responsibility. For example, many CD players 20 have multiple semantic meanings for the fast forward button on the device and these meanings are affected by the current state of the device. Consider the following:

TABLE I

| Current Device Setting | Action | Result |
| --- | --- | --- |
| Device Is Not Playing | FF Button Pressed | Advance to the Next Track and Hold |
| Device Is Playing | FF Button Pressed | Advance to the Next Track and Continue Playing from that Point |
| Device Is Playing | FF Button Pressed | Play in "Fast Forward" Mode and Held Down |

As shown above, the actions taken by the target device vary based on its current state and what the user does with the physical controls. The panel subunit of the present invention defines several user action commands such as "PUSH," "PRESS AND HOLD," and "RELEASE" that are triggered by user interaction with the displayed user interface. In accordance with the present invention, the intelligent controller of the present invention has no notion of what the target device will do in response to the commands that are issued to it. All concerns regarding the state transition as shown in the Table I are handled inside of the target device. It is appreciated that the target device already needs to have this logic in place in order to process the user interaction on its physical control panel. The panel subunit of the present invention is viewed as another mechanism by which to access these logical entry points.

It is important that the intelligent controller always keep the user informed regarding the status of the target device being controlled. In one embodiment, it is possible that the intelligent controller and the user are sitting in one room of a house or business office and the target device is located in another room or office. Because the intelligent controller has no pre-defined knowledge of how to interpret the user interaction elements, it needs to have a mechanism of keeping its display updated with the most current status of the target device. It does this by making use of the status reporting mechanism that has been defined for the AV/C protocol, in one embodiment, using a status descriptor data structure and a panel status notification command in accordance with the present invention.

The status descriptor data structure is a dynamic data structure that is always kept up-to-date by the panel subunit 314 of the present invention. The intelligent controller can examine this structure at any time so that it can update its graphical display to indicate the target device status to the user. The panel status notification command of the present invention allows the intelligent controller to post a notification request to the target device. When any change in the state of the device results in a change to the status descriptor data structure, then the target device sends a notification to the intelligent controller. The intelligent controller then updates its graphical display as appropriate in response to the status information.

Figure 5:
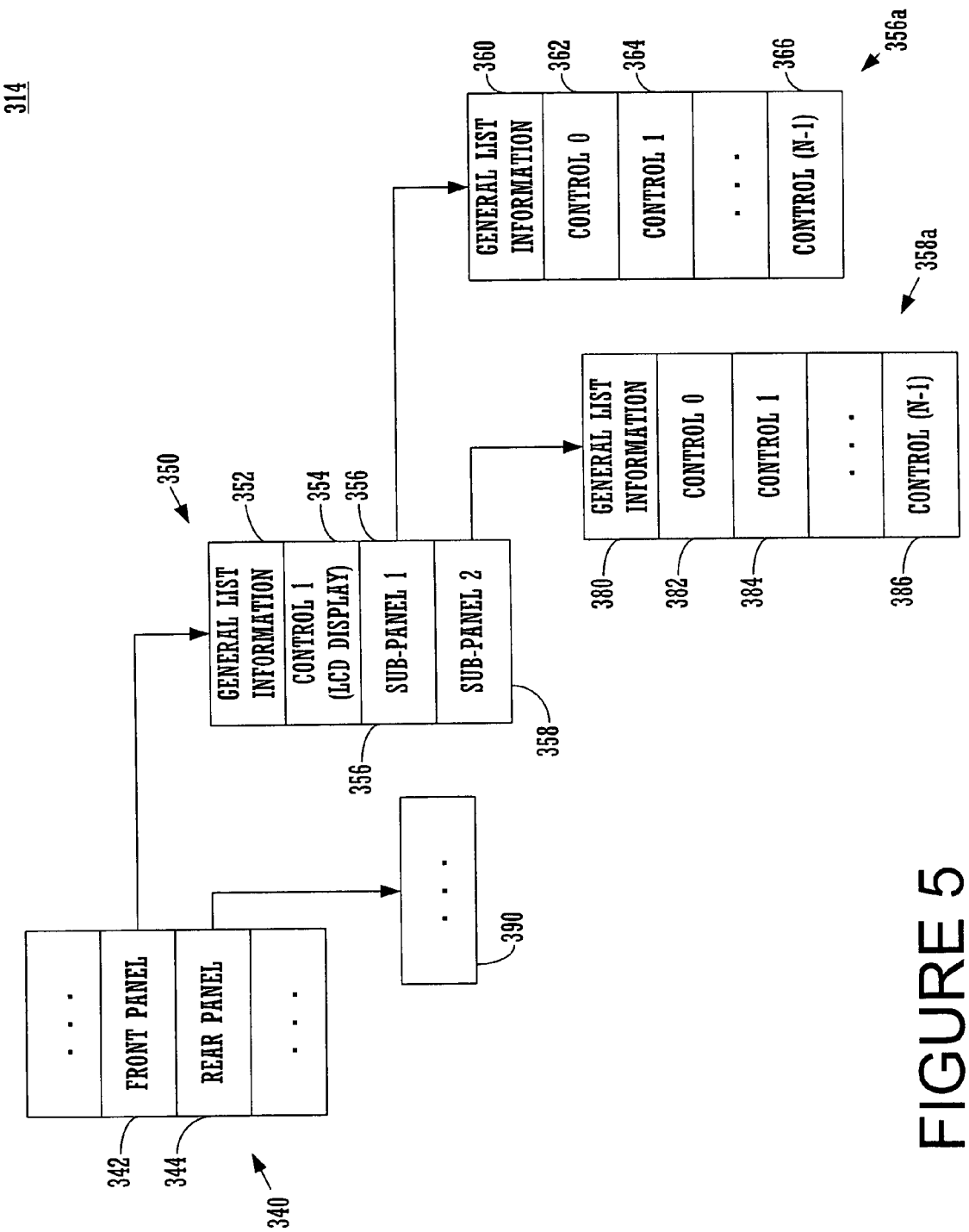
FIG. 5 illustrates descriptor information of a panel subunit in accordance with the present invention including a subunit identifier descriptor, panel lists and object lists of control objects.

The AV/C protocol allows a device (also called a unit herein) to contain any number of subunits of the same type. Therefore, a device can have more than one panel subunit of the present invention. For instance, one panel subunit can be defined for the front panel of FIG. 3B and another panel subunit can be defined for the flip-down panel 220. Other panel subunits can be defined for the side and back panels, if any. Alternatively, a single panel subunit can be defined to encompass several controls as shown in FIG. 5. In this approach, a single panel subunit can contain any number of control lists which are hierarchically ordered. Each control list of the present invention represents a control panel of the target device. All of these lists are accessed via the single panel subunit 314.

Part of the panel subunit data structures includes geometry information describing the layout image and orientation of panels and controls so that they can be represented to the user in a manner similar to their physical appearance on the target device or in a manner "suggested" by the target device. As standard controls can be combined into hybrid controls, this geometry information can also be defined to indicate the presence of panel hierarchies, such as panels hidden behind a front flip-down face 220 (FIG. 3B). This is commonly found in many VCR devices where some basic controls are on the face of the VCR device and the more advanced controls and features are hidden behind the flip-down front panel 220.

Panel Descriptors of the Panel Subunit

FIG. 5 illustrates data descriptor information maintained by computer readable memory units of a target device, e.g., VCR 12. It is appreciated that the data descriptor data structures found in FIGS. 5-8 and 11 are all maintained and realized within computer readable memory units of the target device in accordance with the present invention. The panel subunit 314 (FIG. 4) includes a panel subunit identifier descriptor data structure 340. The identifier descriptor list 340 indicates identifiers for each of the main panel lists supported by the panel subunit 314. Each of these panel lists can contain a control object which has a child list, indicating a panel hierarchy. For instance, primary identifier list 340 relates to the front panel for the target device and includes an identifier (e.g., pointer) 342 which points to a secondary identifier structure 350 which itself includes two sub-panel descriptions (e.g., one for the face of the VCR 12 and one for the flip-down panel 220). The primary identifier 340 also includes an identifier (e.g., pointer) 344 for another secondary identifier list 390 describing a rear panel for the target device. In this manner, the main identifier and the secondary identifier structures of the panel subunit 314 can define hierarchical relationships between the descriptor list information and thereby between the panels and sub-panels themselves.

The secondary identifier descriptor list 350 of FIG. 5 is a descriptor list including a general list information field 352 and one object control descriptor 354 for describing the LCD display 214 (FIG. 3A). A descriptor list within the present invention can include object control descriptors, general information, and pointers to child descriptor lists. Therefore, a control object within a descriptor list can point to another descriptor list indicating a parent-child relationship between the control object and the indicated descriptor list. Descriptor list 350 includes a pointer 356 indicating a child descriptor list 356a used to describe "sub-panel1" which is a portion of the controls of the front panel for VCR 12 in this example. Further, descriptor list 350 includes a pointer 358 indicating a child descriptor list 358a used to describe "sub-panel2" which is another portion of the controls of the front panel for VCR 12. In this example, the descriptor list 356a for sub-panel1 defines the controls on the face of VCR 12, e.g., buttons 225 for the tuner subunit 320. The descriptor list 358a for sub-panel2 defines the controls on the flip-down control 220 of VCR 12, e.g., buttons 250, display 240, and dial 230.

As with any descriptor list data structure, descriptor lists 356a and 358a each contain a respective general list information field 360 and field 380 and also contain respective lists of control objects. In accordance with the present invention, a list which contains control objects for a panel is used to describe the control panel itself, as well as to hold the collection of objects. Generally, information that describes the collection (the panel description) would contain the following: (1) panel identifier (e.g., front, back, left side, etc.); (2) panel layout geometry (e.g., size of panel, orientation of controls, definition of groups, etc.); (3) group descriptions for each group of controls where the following can be defined, group label, group bounding box/position within the panel, and other group related information; and (4) a name for the panel subunit. An example is shown in FIG. 6.

Figure 6:
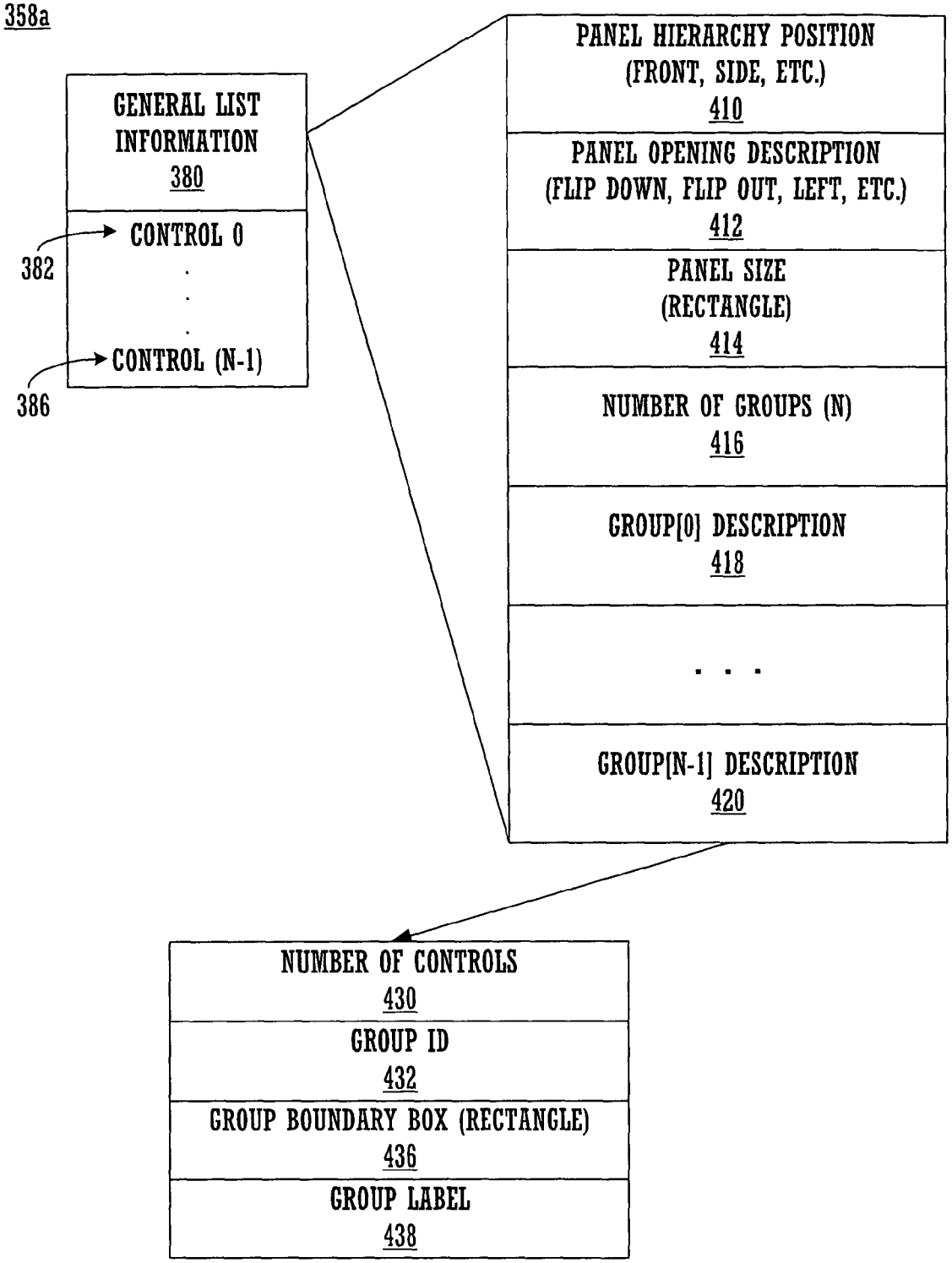
FIG. 6 illustrates the contents of the general list information structure including a group identification structure in accordance with the panel subunit of the present invention.

FIG. 6 illustrates the information included within the general list information data structure 380 of the secondary descriptor list 358a for the front sub-panel1 of the target device. Secondary descriptor list 358a contains general list information 380 and a collection of n objects 382 to 386. Exemplary data structure 380 includes fields 410-420. Field 410 indicates the hierarchical position or identifier for the descriptor list 358a in which the field is included. For instance, field 410 indicates which physical panel the information represented, e.g., whether this descriptor list 358a represents a front, side, rear, etc., control panel. In this example, descriptor list 358a is a "front" panel. Field 412 defines the opening or access options used to obtain access to the control panel for which descriptor list 358a is defined, e.g., flip-down, flip-up, flip-out, left, right, direct access, etc. In this case, control panel 220 (FIG. 3B) has "flip-down" style access. Field 414 defines the general size and shape of the control panel for which descriptor list 358a is defined (e.g., rectangle, circular, oblong, triangle, polygon, etc.). In this case, control panel 220 is rectangular in shape.

Fields 416-420 of FIG. 6 are used to define groups within the control panel for which descriptor list 358a is defined. Groups can be used to separate certain control features that are similar or control a similar function or feature. For instance, buttons that each relate to the control of the tape mechanism for a VCR 12 can be assigned into one group while buttons that control the channel selection or the volume selection of the VCR 12 can be assigned in a separate group. Groups have special functions within the present invention, e.g., they can be displayed spatially together on the display of the intelligent controller, and can have other defined attributes in common. Field 416 indicates the number of groups defined for descriptor list data structure 358a and fields 418-420 represent the group description information for a number of exemplary groups.

FIG. 6 illustrates fields 430-438 which represent an exemplary group description that is contained in field 420 for an exemplary group (n–1). Information field 430 includes the number of control objects that are defined for this group. Field 432 includes a group identification number or string that is unique for this group and used to identify the group by control objects. Each control object that is to be included in the defined group includes the identifier 432 in its object description (described below). Field 436 indicates the spatial boundary box in which this group is included for the control panel. This information indicates where this group exists with respect to other defined groups in the user interface layout and is used for rendering the image of the control panel on the display of the intelligent controller. Field 438 is a group label that can be used to provide access to and represent the control objects of this group for cases where the display unit of the intelligent controller is not sophisticated enough to provide images or further information. Field 438 typically contains a string or other text label that can be used, in one embodiment, as a tab index in a tabbed-panel presentation of information. In a tabbed-panel presentation, all the defined tabs for all groups are displayed along the side of the display and groups are selected for presentation by selecting one tab or another.

FIG. 7A illustrates the data of a control object 382 in accordance with the panel subunit of the present invention. Exemplary control object 382 is included within descriptor list data structure 358a. In one embodiment, the panel subunit of the present invention presents its information to controllers via the AV/C object and object list data structures. These data structures are generic containers whose contents are specialized based on the owner of the structure. A panel subunit of the present invention contains a list of its controls (e.g., list descriptor 358a), with each control being represented by a control object in the list. Within the present invention control objects can be defined to represent user input devices (e.g., buttons, sliders, toggle switches, etc.) and can also be defined to represent information displays (e.g., LCD panels, dials, etc.).

FIG. 7A illustrates the information of a control object 382 representing the LCD panel 214 of FIG. 3A. Field 440 describes the type of control object being defined. In this case it is "LCD Panel" type. Other control types for displaying information include "Display," "Dial," "CRT Display," "LED" and "Alpha/Numeric Display." Other control types for information input devices include "Button," "Slider," "Rotator," "Toggle Switch" and "Rocker Switch." Field 442 includes a graphical image of the control object. This image information is typically raster data (e.g., bit mapped) and may include color and other attribute data. In this particular instance, the control image 442a is in the shape and character of the outline of an LCD display to represent LCD panel 214. Field 442 could also contain a collection of images used for performing animation in a predefined sequence of presentation. Field 444 represents the dimensions of the image 442a and in one embodiment is represented in screen coordinates (x, y). To generalize these coordinates for application with many screen dimensions, the (x, y) values can be represented in relative terms with respect to the left corner, e.g., the (0, 0) coordinate position, of the display screen.

Field 446 of FIG. 7A represents the group identification or name with which this control object 382 is associated. Controls can be clustered into groups based on layout information defined by the panel subunit of the present invention. This field 446 is optional as an object does not necessarily need to be associated with any group at all. If a group is associated with this control object 382, then field 448 represents the relative position 448a within the group boundary 448b in which this control object 382 belongs. This information can be expressed in coordinate values. Field 450 represents the allowable or valid value ranges that can be taken by this control object in response to a user event. This field 450 can also include a data type indicator (e.g., 16-bit representing integer, floating point, etc.) In the case of a display object, field 450 represents the character or icon sets that can be displayed within the control object. In the case of a user input control object, field 450 indicates the range of possible values that can be set by this control object. If the control object was a slider, then a range of values is appropriate. If the control object is a button or toggle switch, then possibly only two states (e.g., 0 or 1) are valid for the control object.

Field 452 of FIG. 7A is optional and represents the equivalent AV/C command that occurs when the control object 382 is activated. This AV/C command can be communicated by the intelligent controller over the network within system 5 when the control object 382 is invoked. Field 452 is optional because the target device has the capacity to interpret changes in the control object as communicated to it by the intelligent controller without the need for a communicated AV/C command. The panel subunit 314 represents the VCR 12 in this example. The manipulation of those controls may cause a state change in other subunits within the target device. The values of field 454 represents which subunit (subunit type and ID) can be effected by this control object. Field 454 is likewise an optional field that indicates the identification of the target device associated with the control object. Again, this information is optionally included within the control object 382 but is maintained by the intelligent controller by virtue of which target object contained the panel subunit in the first instance.

Field 456 is an identifier or name string that can be associated with the control object. In instances where the display device of the intelligent controller is not sophisticated, field 456 can be used to at least provide a basic textual description of the control object which is presented for user interface functionality. Field 458 contains a help string that can be displayed on the display of the intelligent controller if a help feature is employed by the user. The help string describes what the control object does. This can be extended to provide a help string for each state of the control object. The help string can identify the control object and give tips on how to use the control object, its purpose and expected functionality and value range.

FIG. 7B illustrates information associated with an exemplary control object 384 for one of the push buttons of buttons 250 of the flip-down panel 220 of FIG. 3B. In this example, the "Play" button is being represented for VCR 12. Field 460 defines the control object as a "button" control type. Field 462 can contain multiple images or "icons" that can be used for displaying the control object. The icons can, for instance, represent different states of the control object, e.g., such as a button which is highlighted differently whether it is pressed or released. Field 462, in this case, contains a number of icons that represent the image of the button in different states (e.g., pressed or released). Image 462a represents the image for the button pressed and image 462b represents the image of the button for the button released. Field 464 represents the screen dimensions of the images of field 462 and field 466 represents a group identification, if any, for control object 384. In this case, all of the buttons 250 (FIG. 3B) are clustered together into a single group because they control the tape mechanism for VCR 12, e.g., Group Identification="Tape Mechanism," where this group would have to have been previously defined in a data structure of FIG. 6.

Field 468 represents the relative position 468a of the control object 384 within the group boundary 468b. In this case, the control object 384 represents the third button from the left within the collection of buttons 250. Field 470 represents the possible range of values can be represented by the button, e.g., in this case 0 to 1, and the value is an integer. If the control object was a slider, then a possible range of values (e.g., 0 to 10) could be represented with the values being integer or floating point type.

Optional field 472 represents the equivalent AV/C command for "Play" and can be communicated by the intelligent controller when control object 384 is pushed. When a user event such as PRESS is issued, it may result in the same action as if a standard AV/C command, such as the VCR subunit PLAY command, had been issued. The value of field 472 is the opcode of the equivalent AV/C command. Optional field 474 represents the network identification for the target device (in this case, the VCR subunit). Field 476 is an identifier or name string that can be associated with the control object, e.g., "Play." In instances where the display device of the intelligent controller is not sophisticated, field 476 can be used to at least provide a textual description of the control object which is presented for user interface functionality. Field 478 contains a help string that can be displayed on the display of the intelligent controller if a help feature is employed by the user, e.g., "Press Play to Start Watching A Tape in the VCR." The help string could also describe why the control object is in a particular state, e.g., "The Play Button is Disabled Because There is No Tape in the VCR."

It is appreciated that the control objects of FIG. 7A and FIG. 7B are exemplary only and that other similar control object descriptions can be used to realize a user interface for all user inputs and user displays of the VCR 12 for all control panels. It is further appreciated that each other control object of FIG. 5 can analogously be defined in accordance with the present invention.

Figure 8:
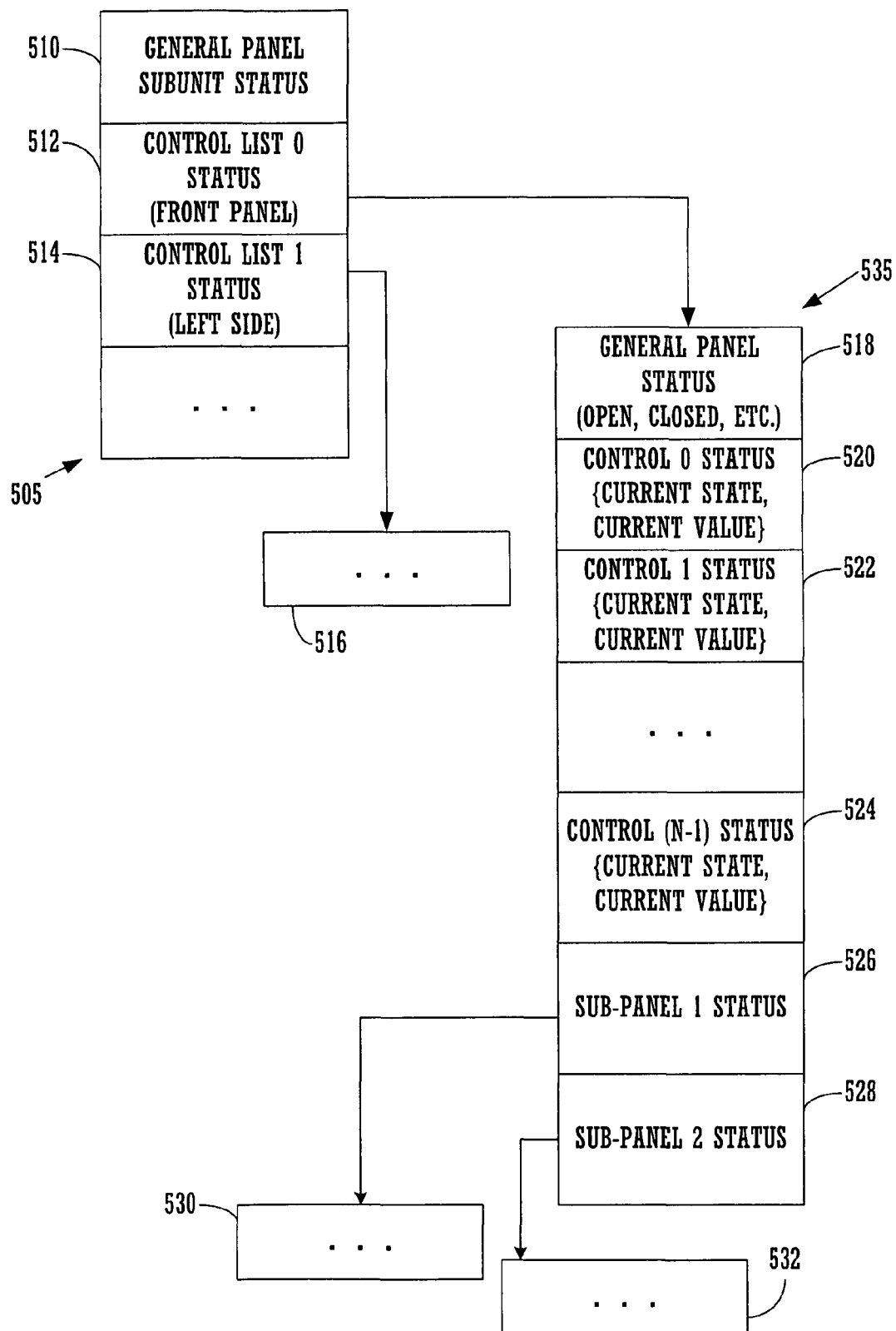
FIG. 8 illustrates a panel subunit status descriptor data structure in accordance with the present invention.

FIG. 8 illustrates a panel subunit status descriptor 500. The panel subunit 314 of the present invention also includes a panel subunit status descriptor 500 data structure. The status descriptor 500 is a data structure maintained in computer readable memory units of the target device and represents the current state of all control objects defined for a particular panel subunit in accordance with the present invention. The information maintained in the status descriptor 500 is dynamic, and is kept up-to-date by the panel subunit 314 of the present invention. Within the status descriptor 500, a separate control status field is maintained for each defined control object. When changes occur to the status descriptor 500, a notification can be forwarded to any intelligent controller that previously indicated that it was to be notified of any changes. The overall status descriptor 500 contains two main areas, one area 510 contains general status information for the panel subunit and a separate area 512 is defined for each of the control list hierarchies. Within each of these control list areas are status information for each control. Status information includes the current state of the control object (e.g., the button is currently pressed) and the current value of the control object (e.g., the LCD panel is currently displaying the text "Enter Track Name.").

In operation, an intelligent controller can request notification for individual control lists or for the general area of the panel status descriptor 500. When the status of one of these areas changes, the intelligent controller is notified. If status for an area changes for which an intelligent controller had not requested notification, the intelligent controller is not notified. This operation allows the various controllers and target devices to optimize the use of the system network bandwidth by not sending out unnecessary messages.

Status descriptor 500 of FIG. 8 is shown as an example and includes a primary status list 505 which includes a general information field 510 for panel subunit 314 and pointers 512 and 514 to other major status lists. Pointer 512 points to status list 535 for representing the status of the front panel. Status list 535 includes a status field for each control object defined for the front panel. Pointer 514 points to the status list 516 for an exemplary left side panel. Field 518 of status list 535 indicates general status information for any control objects defined with respect to the front panel including whether or not the panel is open, closed, etc. Field 520 represents the current state/value of control object 0 defined for the front panel. Likewise, field 522 represents the current state/value of control object 1 defined for the front panel.

Field 526 is a pointer to the control list 530 indicating the states/values for the control objects defined with respect to the sub-panel1 of the front panel. These control objects are defined with respect to descriptor list 356a (FIG. 5). Within status list 530, a separate control status field is defined for each control object. Field 528 of control list 535 is a pointer to the control list 532 indicating the states/values for the control objects defined with respect to the sub-panel2 of the front panel. These control objects are defined with respect to descriptor list 358a (FIG. 5). Within status list 532, a separate control status field is defined for each control object.

Figure 9:
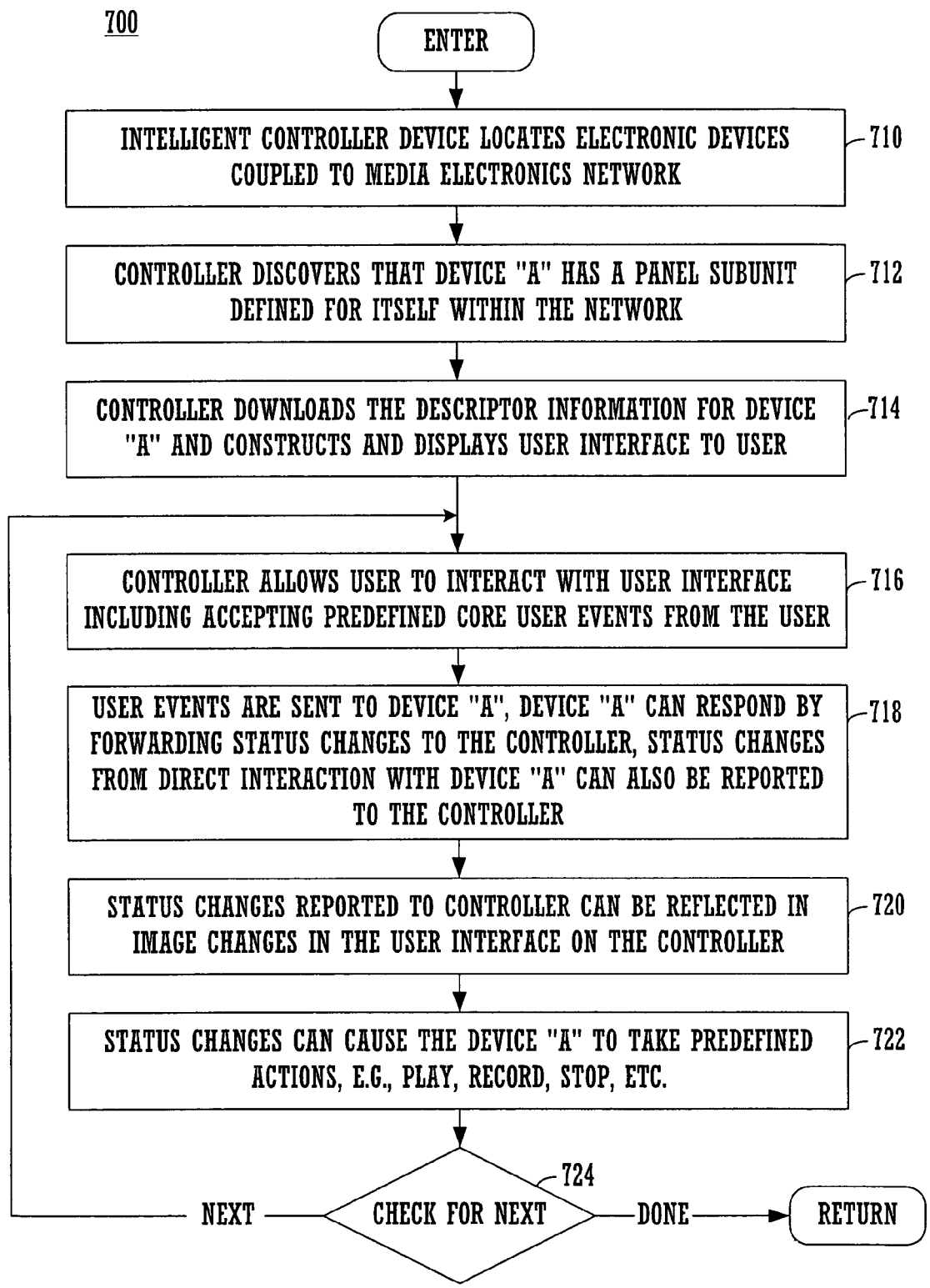
FIG. 9 is a flow diagram of steps performed by an intelligent controller in accordance with the present invention for generating a user interface.

FIG. 9 is a flow diagram illustrating steps of a process 700 implemented in accordance with the panel subunit of the present invention. Process 700 is realized as program code stored within computer readable memory units of an intelligent controller and a target device of network 5. At step 710, the intelligent controller device, e.g., STB 13 and TV 11 (used as the display unit), locates electronic devices coupled to system 5. This process utilizes well known IEEE 1394 communication protocol mechanisms. At step 712, the intelligent controller reads the computer readable memory units of a target device coupled to the network 5 and discovers that this target device has a panel subunit data structure 314 defined therein. At step 714, the intelligent controller device downloads the descriptor information and the current status descriptor table for the target device and displays a user interface on the display screen of the intelligent controller based on the downloaded information. If the intelligent controller device has limited memory resources, then the panel subunit information can be downloaded and processed in portions.

At step 714, the control objects of the panel subunit describe the look, shape, grouping and location for each user input element and each information display element for the user interface. Should the intelligent controller be limited in display capability, then text strings are displayed for the groups and/or for the control objects and these text strings can be displayed in a hierarchical format (e.g., using a tabbed-panel display).

At step 716 of FIG. 9, the intelligent controller allows the user to interact with the user interface including accepting predefined or generic user events from the user. Each control object contains an object type and each object type defines a user action that can take place with respect to the control object. For instance, buttons are "PUSHED" or "PUSHED AND HELD" or "RELEASED" and sliders and rotators can be moved to "SET A VALUE." Toggle switches can be moved between two positions, e.g., "MOVED RIGHT" or "MOVED LEFT" or "MOVED UP" or "MOVED DOWN." Other user events include setting a text value, e.g., SET TEXT VALUE, or setting a numeric value, SET VALUE, etc. These user events are defined by the control objects themselves and the intelligent controller does not interpret the meanings of these events for any target device.

At step 716, irrespective of the type of user input device, e.g., keyboard, mouse and mouse button, remote control unit, pen and stylus, light pointer, joystick, etc., the intelligent controller translates the interaction between these user input devices and the user into a generic user event core recognized by the panel subunit 314 of the present invention. For instance, a button control object can be "PRESSED" and then "RELEASED" by selecting it with a mouse or selecting it with a keyboard or with a remote control button push. In either case, the user event is "PRESSED" or "RELEASED" with respect to the control object.

At step 718 of FIG. 9, any user events detected by the intelligent controller are forwarded over the network 5 to the target device. The target device then interprets the user event and takes the appropriate action based on its programming. The programming used by the target device at step 718 is the same programming that is already present in the target device for responding to the input devices physically located on the target device. In this case, any target device having physical controls located thereon already is programmed with the required actions to take upon these controls being directly pushed by a user. The present invention takes advantage of this pre-existing functionality within each target device. A received user event may trigger a change in one or more of the states of the control objects defined within the panel subunit of the present invention. Upon a change in state, the status descriptor 500 of the panel subunit changes thereby notifying the intelligent controller of a state change.

At step 720, the intelligent controller downloads the status descriptor to determine which control object changed states. Next, the intelligent controller updates the displayed user interface to reflect the change. For instance, if the button state changed from released to pressed, then the intelligent controller may display a new image for the button state being pushed. Alternatively, if the state of the VCR tape mechanism changes from standby to play, an image within LCD panel 214 might become animated showing the tape playing, etc. At step 722, the generic user events cause the target device to implement a certain action, e.g., play, pause, etc. It is appreciated that step 722 can occur before step 720. At step 724, processing returns to step 716 to check for a next user action.

In operation, the intelligent controller is not burdened with keeping state tables or by interpreting the meaning of the user events. These interpretations are performed by the target device thereby providing the panel subunit with a large amount of flexibility for adapting to new standards and control types. Furthermore, by providing a range of possible display representations, the present invention provides a flexible user interface for intelligent controllers having robust display capabilities and also for those controllers having unsophisticated displays. The panel subunit of the present invention defines generic user input events, core data structures which define a limited set of user actions or events and display elements and a basic communication protocol is used.

Figure 10:
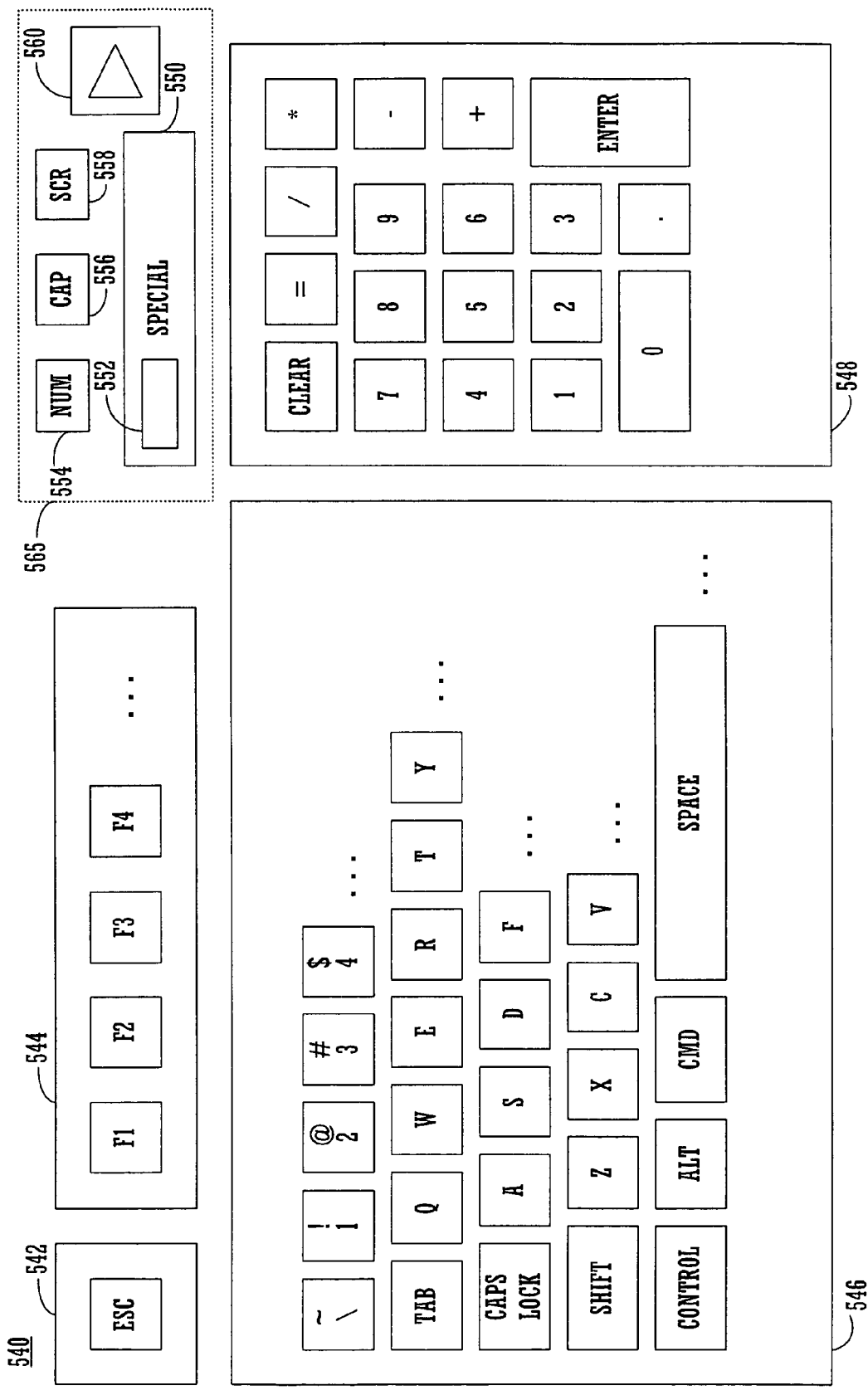
FIG. 10 illustrates an exemplary user interface displayed by the present invention based on a panel subunit and representing an on-screen keyboard.
Figure 11:
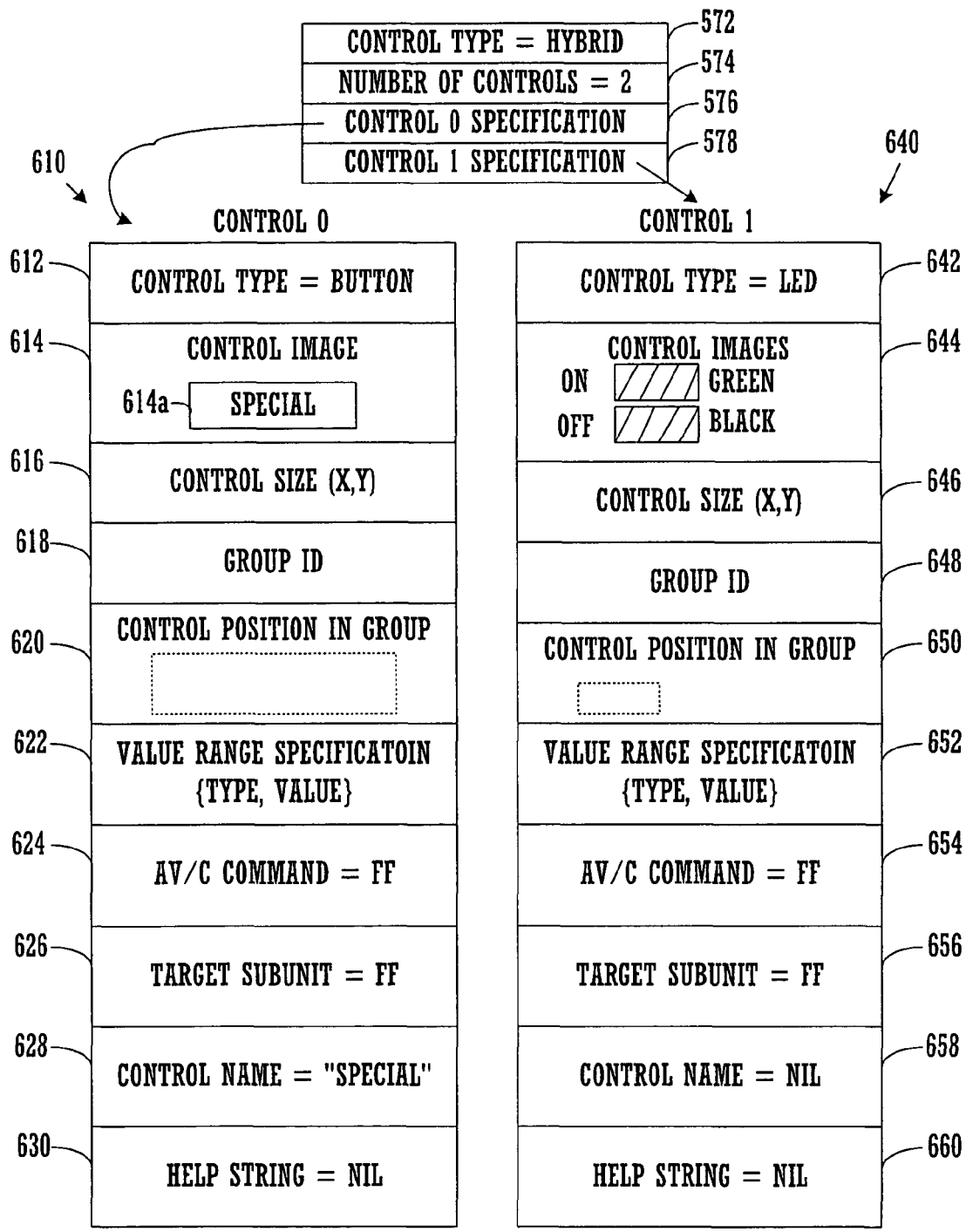
FIG. 11 illustrates exemplary panel subunit descriptor information for generating the on-screen keyboard example of FIG. 10 in accordance with the present invention.
Figure 12:
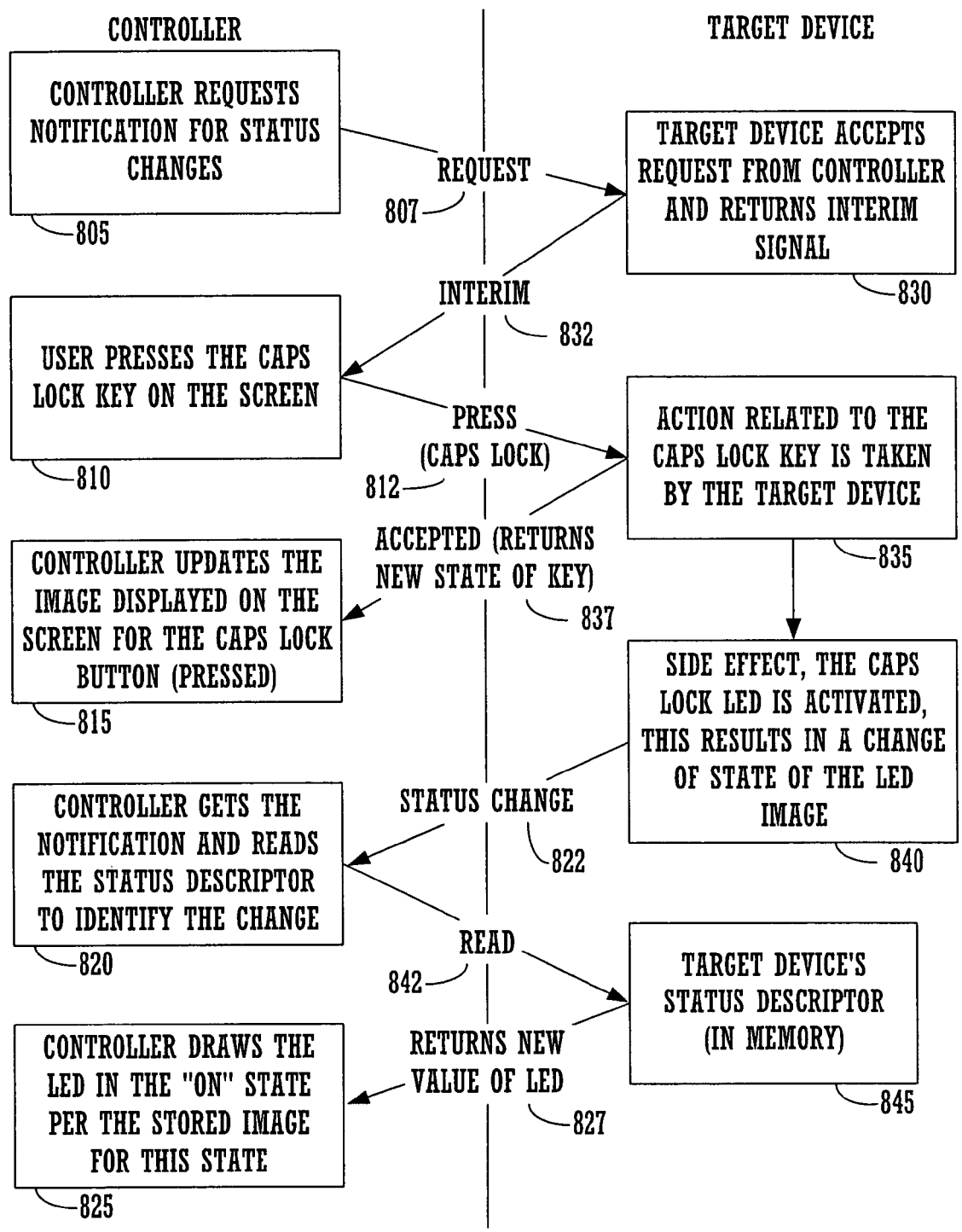
FIG. 12 illustrates exemplary steps and communications between an intelligent controller and a remote target device in accordance with the panel subunit of the present invention.

FIGS. 10-12 illustrate another example of the present invention. FIG. 10 illustrates a simulated or "virtual" keyboard 540 that can be generated for a target device using the panel subunit of the present invention. The virtual keyboard 540 can be used to control a "black box" device that itself has no physical keys or LEDs and whose control panel is purely virtual. In this case, the black box has no physical equivalent keyboard and relies on the intelligent controller for access to its functionality. In one example, the target device can be a subpanel for an intelligent television which has embedded software that requires user input, e.g., for web surfing or similar tasks.

The virtual keyboard 540 includes groups of controls where each control defines a key or an LED. Each element is represented by its own control object. The virtual keyboard 540 of FIG. 10 includes several groups (e.g., main keys, function keys, keypad keys, etc.) with various dimensions and layouts. A first group 542 includes only the ESC key while the function keys, F1-F(n), are grouped into group 544. The standard alpha keys, the tab, caps lock, shift, control, etc., keys are grouped into group 546. The numeric keys and operator keys are grouped into group 548. Also included are a numlock LED 554, a caps lock LED 556 and a scroll lock LED 558. A power on key 560 is shown along with a special button 550 having an LED 552 therein. An LED 552 embedded in the key 550 can be modeled as an LED which can be turned on or off with the appropriate panel subunit command. Thus, a key with an LED is modeled as a hybrid control object. Group 565 includes LEDs 554, 556, 558, 552 and buttons 560 and 550.

FIG. 11 illustrates the control object descriptor information within the panel subunit needed to realize the hybrid button 550 as an example in accordance with the present invention. Fields 572-578 define a control object. Field 572 indicates that the control object is a "HYBRID" type. Field 574 indicates that two control object definitions are included in this hybrid. Field 576 is a pointer to control object 610 (control0) while field 578 points to control object 640 (control1).

With respect to control0 control object 610, field 612 indicates that the object is a "button" type and field 614 indicates the button image 614a. Field 616 indicates the button dimensions (x, y) and field 618 indicates a group identifier for group 565. Field 620 indicates the relative position of button 550 within the boundary of group 565. Field 622 indicates the range of values for the button 550 (e.g., 0 and 1). Field 624 represents the optional AV/C command, if any, corresponding to the states of button 550. Field 626 is the optional target device identification. Field 628 is the string "Special" for displays that may have only text display capability. The help string, if any, is in field 630.

With respect to control1 control object 640, field 642 of FIG. 11 indicates that the object is an "LED" type and field 644 indicates the images for the different states of the LED, e.g., green for the ON state and black for the OFF state. Field 646 indicates the LED image dimensions (x, y) and field 648 indicates a group identifier for group 565. Field 650 indicates the relative position of LED 552 within the boundary of group 565. Field 652 indicates the range of values for the button 550 (e.g., ON and OFF). Field 544 represents the optional AV/C command, if any, corresponding to the states of LED 552. Field 656 is the optional target device identification. Field 658 is the string for LED 552 for displays that may have only text display capability. The help string, if any, is in field 660 Using the examples of FIG. 11, the control objects for the remainder of FIG. 10 can be realized.

FIG. 12 illustrates steps performed by the intelligent controller and the target device, and communications there between, for interacting with the virtual keyboard 540 of FIG. 10. At step 805, the intelligent controller sends a request 807 to the target device for a notification upon any changes of the status descriptor for the virtual keyboard 540. At step 830, the target device accepts the request 807 and generates an interim signal 832 to the intelligent controller acknowledging the request 807. At step 810, the user interfaces with the virtual keyboard 540 such that the user event "PRESS" is indicated on the caps lock key of group 546. The user event "PRESS" caps lock is then transmitted 812 from the intelligent controller to step 835 of the target device.

At step 835, the target device takes any action required by this user event according to its own preset programming. The status descriptor changes and this causes a status response (e.g., to the PRESS command) to be generated by the target device. At step 835, the target device forwards a new status 837 of the caps lock key to the intelligent controller indicating that the caps lock key is now pressed. Only after receiving the new status information 837 does the intelligent controller change the image of the caps lock button on the display to indicate that it is now pressed. As a side effect of the action taken by the target device, at step 840, the state of the caps lock LED 556 changes from OFF to ON. The status descriptor changes and this causes a status update message to be generated by the target device. This change in status is reported by message 822 to the intelligent controller in response to a change in the status descriptor. The intelligent controller, in response to message 822, reads the status descriptor 845 of the target device to determine which control object changed status. At 827, it is determined and returned that the status of the LED 556 changed from OFF to ON. Only in response to receiving the new status information does the intelligent controller, at step 825, then update the image for the LED 556 from black to green to indicate the new status of ON.

It is appreciated that a direct interaction with the physical controls of the target device at step 840 can also cause a state change in the status descriptor which would then cause a notification of a status change to be forwarded to the intelligent controller. This action would also cause a change in the user interface displayed on the intelligent controller as described above The process can be repeated.

One embodiment of the present invention describes the representation of device capabilities which have some types of physical control or display, e.g., something that is user-visible and that would be manipulated by a human. However, the panel subunit of the present invention can be extended to describe how to access functionality that is "built-in" to a device but which does not have a physical external button to access it. For example, many digital set-top-boxes can contain one or more MPEG2 decoders, which contain very useful media processing functions. However, it is very unlikely that there would be an MPEG2 button on the device for the user to push. Rather, the panel subunit of the present invention can be used to define interface objects within a descriptor that represent "virtual" buttons and dials for interfacing with the MPEG2 decoder. Therefore, the capabilities of the MPEG2 decoder and the means to access its capabilities can be described using the present invention even though no physical interface elements exist on the set-top-box.

In furtherance of the above, because the panel subunit 314 of the present invention defines various types of controls and their attributes, it is possible for a "black box" device to be built which has no physical controls, but relies on its panel subunit of the present invention as its only means of being controlled (e.g., the virtual keyboard 540). Such a target device might be designed for situations where the hardware can be located in a remote or hidden location and the user control center (e.g., the intelligent controller) is at a different location. In this case, the target device would not have physical controls on its surface because they would never be used directly by a person.

Another embodiment of the present invention is drawn to the types of information or attributes that are provided by the functionality descriptors of the panel subunit. For example, the present invention describes various attributes for a button control including its physical appearance, size and shape, a text string describing the function, e.g., "play," possibly a help string describing how to use it, and some standard commands for manipulating that control, e.g., PUSH BUTTON or SET BUTTON VALUE TO 1. A variation of this functionality can add some other attributes that may be useful either in a general way or a vender-specific way.

Table GUI Extension to Panel Subunit

Although the panel subunit mechanism allows a target to communicate user interface information to a controller, the controller may reorder the elements displayed on its screen to accommodate other limitations, e.g., screen size, etc. If a controller does not have the ability to display a rich interface, it may alter the order and appearance of the interface elements ("objects") in order to accommodate its display capability. As such, a target using only the panel subunit as described above has no guarantee that its interface elements will be displayed in any prescribed order or appearance as specified by the target. Furthermore, controllers are typically limited in terms of screen size and memory capabilities and may be therefore incapable of displaying a large amount of information (e.g., an entire electronic programming guide) all at once. To that end, the table GUI element extension to panel subunit of present embodiment provides a way for a target to define a table GUI to be displayed on the controller. Further, the table GUI element extension of the present embodiment provides a way for a controller to display tabulated information one section at a time. The table GUI element extension of the present invention also enables users to perform scrolling. This is particularly useful in cases such as electronic program guides (EPGs) where vertically aligned and horizontally aligned information carries meaning within the guide and where the controller can display a small section of EPG information at a time.

Figure 13:
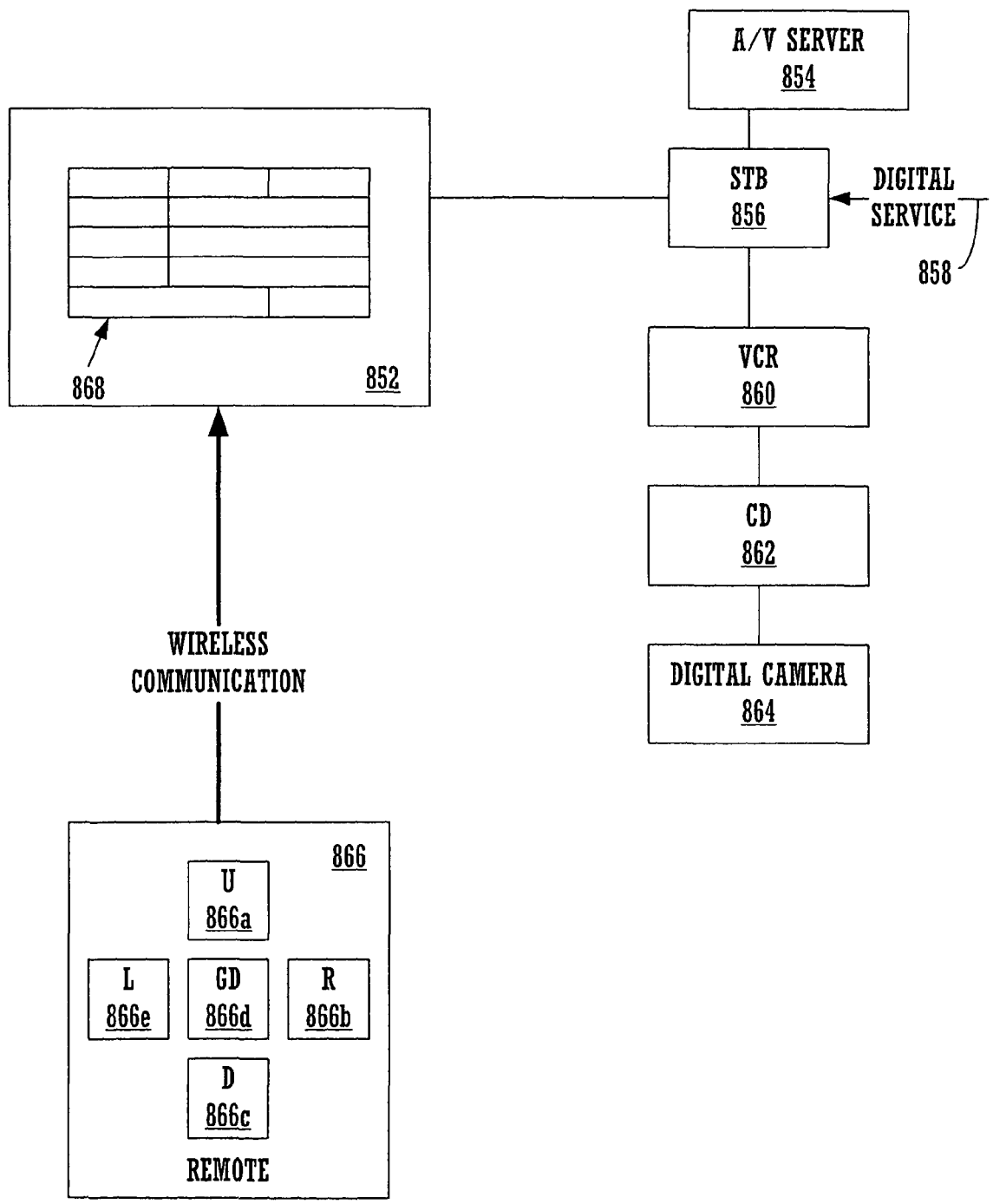
FIG. 13 illustrates an exemplary network of electronic devices in which embodiments of the present invention may be practiced.

FIG. 13 illustrates an exemplary network 850 of electronic devices that may make use of the table GUI element extension of the present invention. This exemplary network 850 (connected via a high speed bus, e.g., the IEEE 1394 bus) contains a controller 852 (e.g., digital television unit) coupled to set-top-box device 856 (the "target"). The STB 856 receives content via a cable input 858. STB 856 may also receive through cable input 858 electronic programming guide information. Other devices within the exemplary network 850 include an audio/video server disk 854, a VCR 860, a CD 862 and a digital camera 864. To implement the present invention, only the target 856 and the controller 852 are required. The controller 852, in this case, includes a remote control unit 866 which contains special function keys, such as, a guide button 866a, a selection up button 866a, a selection down button 866c, a selection right button 866b and a selection left button 866e. Buttons 866a-866c and 866e are used for altering the focus of a displayed image during user navigation. Focus refers to a highlighted or otherwise distinguished screen object. When pressed, the guide button 866d causes an EPG 868 to appear on the controller screen 852.

Figure 14:
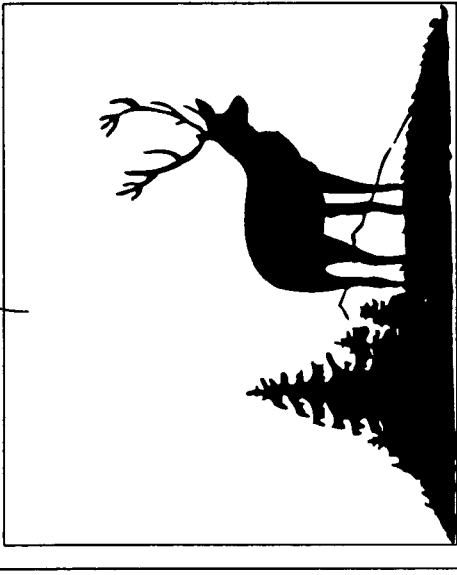
FIG. 14 is a depiction of an exemplary electronic program guide (EPG) displayed by a controller device in accordance with an embodiment of the present invention.

FIG. 14 illustrates an exemplary EPG 868 in more detail. EPG 868 includes an EPG table 874 containing vertically and horizontally aligned information representing programs. A particular selected program 876 is also shown highlighted. Each separate display item can be considered an object, and each object is displayed with the particular order shown in FIG. 14, otherwise the EPG 868 will not make any sense to a user. Also shown in FIG. 14, but optional, is a decimated video image 870 of the selected program 876 and a text description 872 of the selected program 876.

Figure 15:
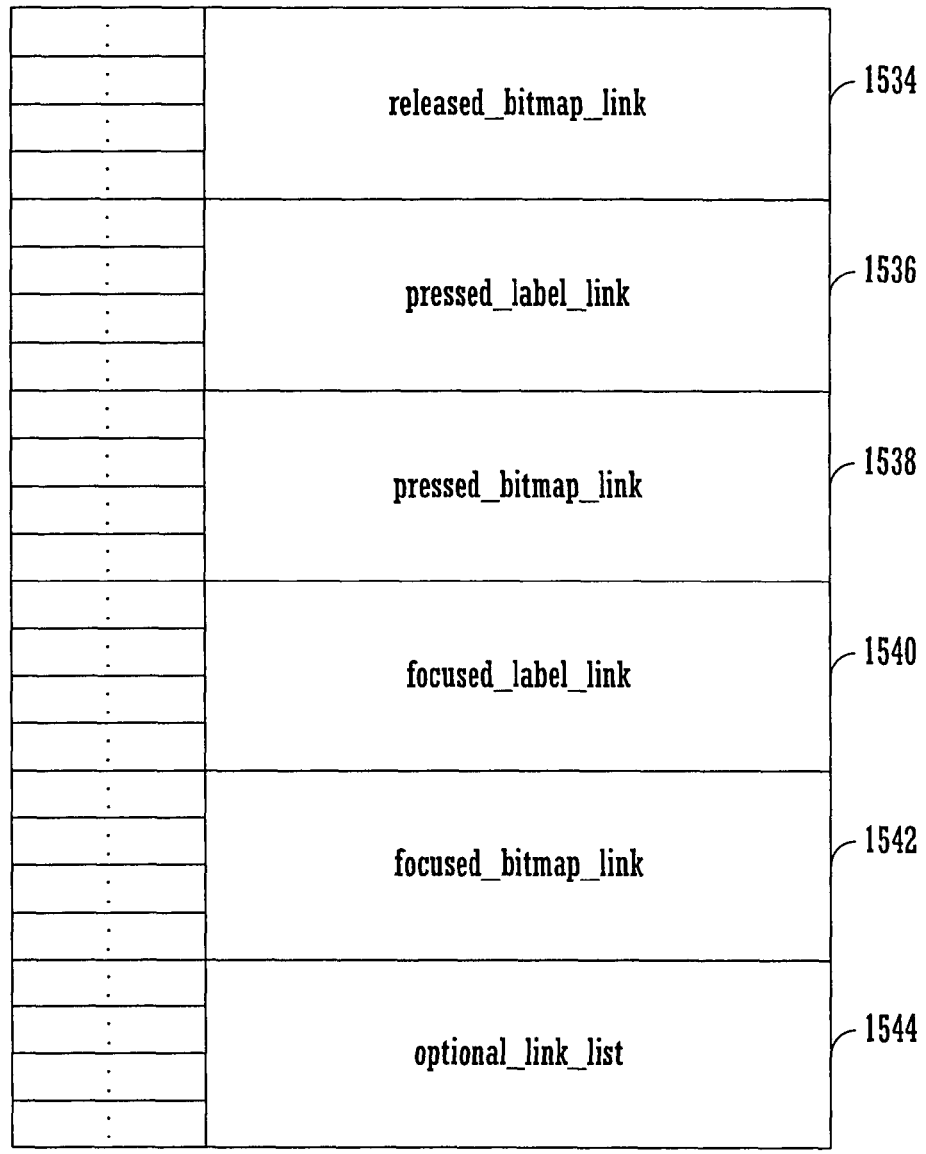
FIG. 15 illustrates a particular implementation of a table GUI element descriptor in accordance with one embodiment of the present invention.

The present embodiment of the invention, a table GUI element extension of panel subunit, enables the EPG table 874 to be displayed by the controller 852. FIG. 15 illustrates a particular implementation of a table GUI element descriptor 1500. In the present embodiment, table GUI element descriptor 1500 is maintained by computer readable memory units of a target (e.g., STB 856). Further, in the present embodiment, the table GUI element descriptor 1500 presents its information to the controller such that a table user interface can be generated by the controller.

As illustrated in FIG. 15, "descriptor_length" field 1502 contains the length of the table GUI element descriptor 1500. "List_type" field 1504 contains list type information for indicating to a controller that descriptor 1500 describes a table GUI element. "Attributes" field 1506 describes the attributes of the table GUI element. "Size_of_list_specific_information" field 1508 describe the size of the list specific information. "Content_width" field 1510 and "content_height" field 1512 describe the dimensions (width and height) of the table to be displayed, and in one embodiment is being represented in screen coordinates. "Number_of_x_item" field 1514 describes a number of columns of the table GUI element. "Number_of_y_item" field 1514 describes a number columns of the table GUI element.

It should be appreciated that, in the present EPG example, due to screen-size limitations, the controller can only display a small section of available EPG information at a time. This is accomplished by using fields 1518, 1520, 1522 and 1524 of the descriptor 1500. "Start_item_of_display(x)" field 1518 and "start_item_of_display(y)" field 1520 describe, respectively, the starting column number and the starting row number of a table to be displayed. "Display_range(x)" field 1522 and "display_range(y)" field 1524 describe, respectively, the number of columns and the number of rows to be displayed. Because only a small section of available EPG information is displayed at a time, the target does not need to transmit the all the EPG information to the controller. Rather, the target may transmit to the controller only information pertaining to the section to be displayed. The controller would then generate a table based on such information.

Table GUI element descriptor 1500 also includes a "selectable" field 1526 for describing whether each respective objects of the table GUI element is selectable. "Optional_attributes_list" field 1528 describes an optional attributes list for the table GUI element. "Number_of_links(n)" field 1530 describes a number of links for each of the objects of the table GUI element. "Released_label_link" field 1532 describes a released label link that points to a memory area storing the label for an object when it is released. "Released_bitmap_link" field 1534 describes a released bitmap link that points to a memory area storing the bitmap for the object when it is released. "Pressed_label_link" field 1536 describes a pressed label link that points to a memory area storing the label for the object when it is pressed. "Pressed_bitmap_link" field 1538 describes a pressed bitmap link that points to a memory area storing the bitmap for the object when it is pressed. "Focused_label_link" field 1540 describes a focused label link that points to a memory area storing the label for the object when it is focused during focus navigation. "Focused_bitmap_link" field 1542 describes a focused bitmap link that points to a memory area storing the bitmap for the object when it is focused. "Optional_link_list" field 1544 describes other optional link list for the object. In the present embodiment, each object of the table GUI element has its respective links.

FIGS. 16A-16D illustrate exemplary data flow between a controller 852 and a target 856 for generating table GUI in accordance with one embodiment of the present invention. In this embodiment, the target is responsible for generating and maintaining a table GUI element descriptor. The controller retrieves the descriptor from the target, and generates a table GUI according to the definitions provided by the table GUI element descriptor. Because the table GUI element descriptor defines the rows and columns of a table to be displayed, elements of the table GUI are displayed in the exact order as specified by the target.

Figure 16A:
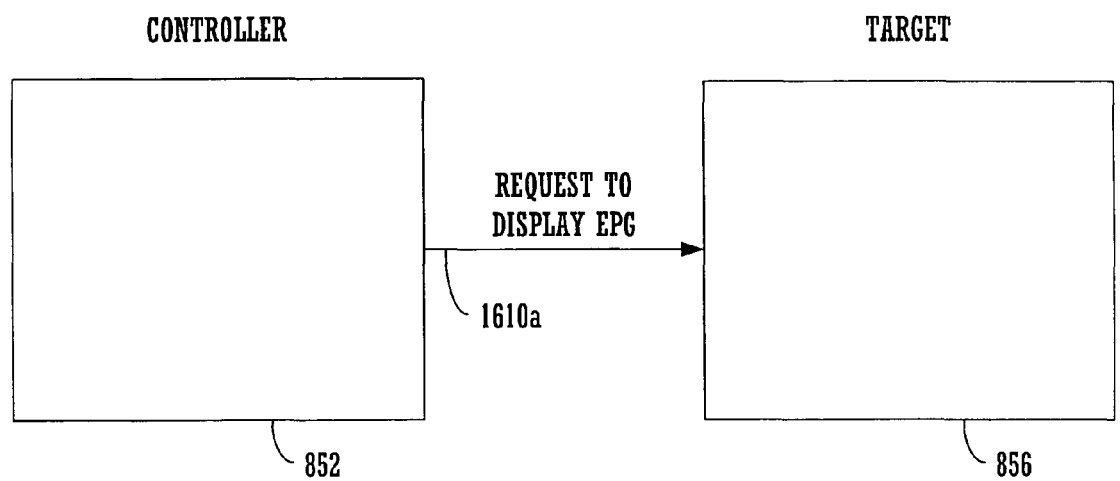
FIGS. 16A, 16B, 16C and 16D represent data flow between a controller and a target for generating table graphical user interface with a table GUI element descriptor in accordance with one embodiment of the present invention.

FIG. 16A illustrates, by data flow 1610a, the controller 852 sending to target 856 a request to display an EPG. In one embodiment of the present invention, the request is generated by the controller 852 when a user presses a button on a remote (e.g., button 866d of remote control 866). Further, in the present embodiment, the request be sent using panel subunit mechanisms discussed above.

Figure 16B:
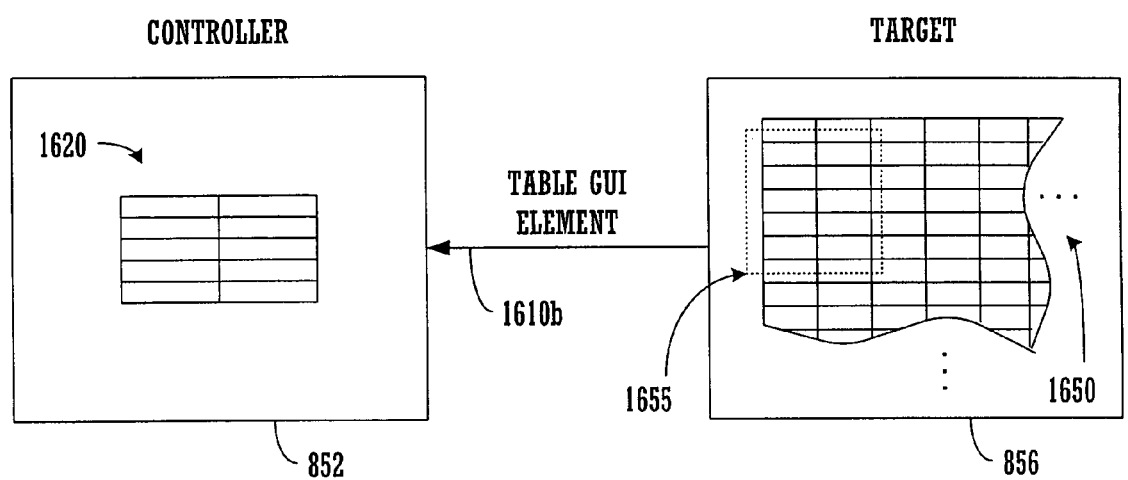

FIG. 16B illustrates, by data flow 1610b, the controller 852 retrieving a table GUI element descriptor from target 856. In the present embodiment, the table GUI element descriptor defines an EPG table 1620 to be displayed. The EPG table 1620, as illustrated includes two columns and five rows and corresponds to a section 1655 of available EPG information 1650. Data flow 1610b may also include definitions of other display elements such as display labels, scroll bars, etc.

FIG. 17A illustrates a more detailed view of the EPG table 1620. As illustrated in FIG. 17A, EPG table 1620 includes five rows 1621, 1623, 1625, 1627 and 1629. EPG table 1620 also has two columns 1622-1624. The "objects" or "cells" of the EPG table 1620, as well as their positions within the matrix, are defined by the table GUI element descriptor (e.g., descriptor 1500). Also illustrated in FIG. 17A is a focused object 1626.

Figure 16C:
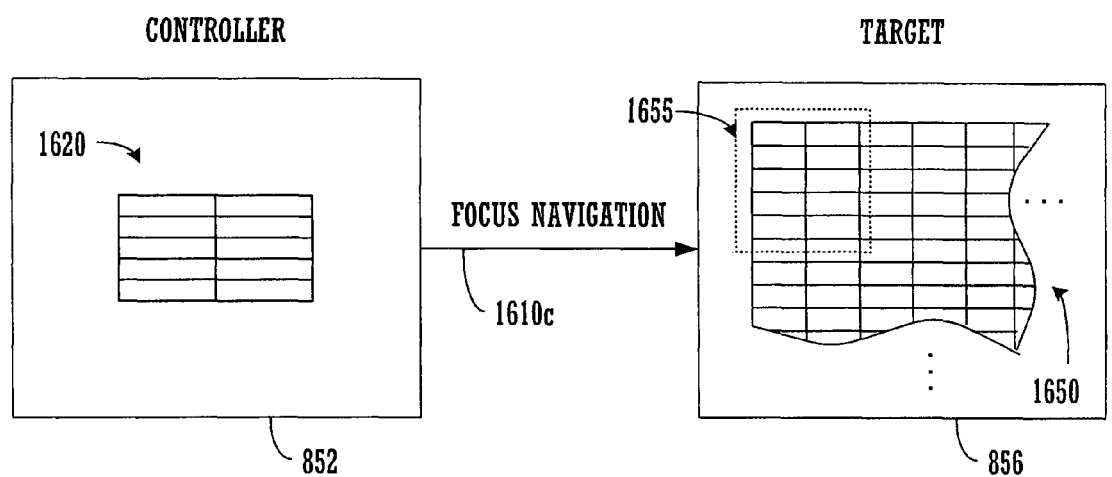

As shown by FIG. 16C, in response to a user input, the controller 852 sends a focus navigation command (via data flow 1610c) to the target 856.

Figure 16D:
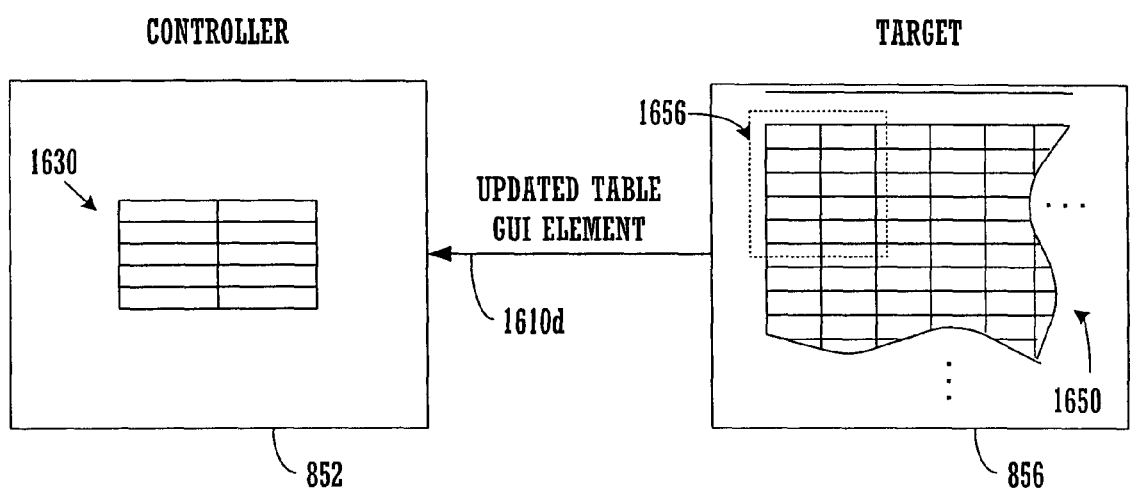

In FIG. 16D, the target 856 updates the table GUI element descriptor. As shown by data flow 1610d, the controller 852 retrieves the updated table GUI element descriptor and constructs a new EPG table 1630.

A more detailed view of the new EPG table 1630 is illustrated in FIG. 17B. The dimension of the new EPG table 1630 is the same as that of EPG table 1620. However, the new EPG table 1630 includes a new row 1631. Row 1629 of EPG table 1620 is no longer displayed. Essentially, the new EPG table 1630 displays another section 1656 of all available EPG information 1650. According to the present embodiment, the new EPG table 1630 is brought about by modifying the starting row number value (e.g., field 1520) of the table GUI element descriptor. Also illustrated is a new focused object 1628 brought about by the focus navigation command.

Figure 18:
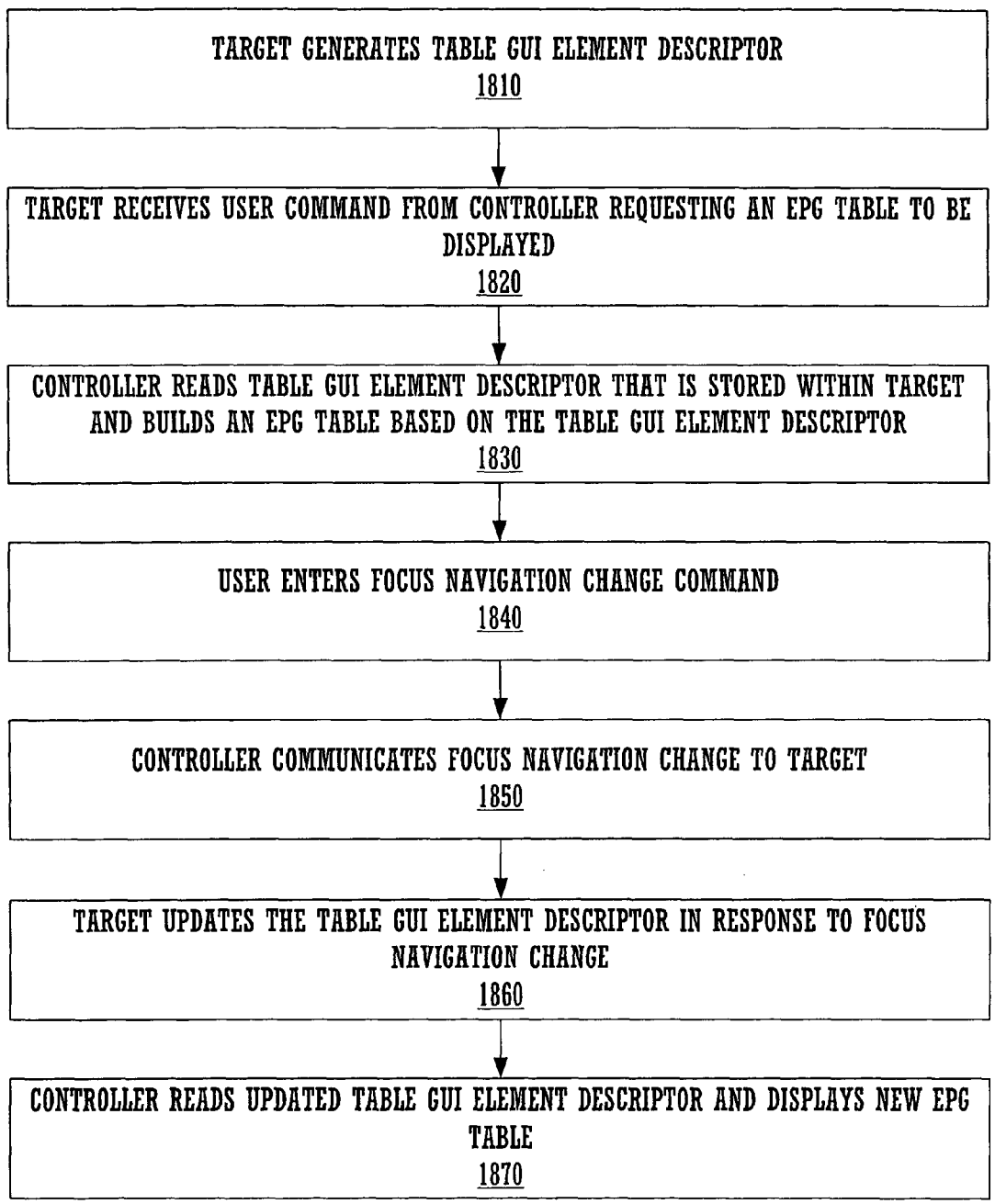
FIG. 18 illustrates a flow diagram of steps performed within an electronic network for constructing an EPG table using a table GUI element extension to panel subunit according to one embodiment of the present invention.

FIG. 18 illustrates a flow diagram 1800 of steps performed within an electronic network (e.g., network 850) for constructing an EPG table using a table GUI element extension to panel subunit according to one embodiment of the present invention. At step 1810, target (e.g., a set of box) receives a complete electronic programming guide (EPG) via a digital service connection, and generates a table GUI element descriptor. In the present embodiment, the GUI element descriptor (e.g., descriptor 1500) defines an EPG table to be displayed. More particularly, the table GUI element descriptor defines the starting row number and column number, the display range, and labels and bitmaps for objects of the EPG table. Further, objects of the EPG table are according to channel numbers and show times.

At step 1820, the target receives a user command from the controller requesting an EPG table to be displayed on the controller. In one embodiment, the user command may be sent using panel subunit mechanisms discussed above. In another embodiment, the user command may be sent using a command pass-through mechanism. The command pass-through mechanism is discussed in more details in co-pending U.S. patent application Ser. No. 09/585,706, entitled "COMMAND PASS-THROUGH FUNCTIONALITY IN PANEL SUBUNIT," by Hisato Shima, Atsushi Suzuki and Takuya Nishimura, which is hereby incorporated by reference.

At step 1830, in response to a user selection, the controller reads the table GUI element descriptor that is defined by the target, and constructs an EPG table based on information defined by the descriptor. For instance, if the table GUI element descriptor specifies that the starting row number is P and the starting column number is Q and the display ranges are X rows and Y columns, then the controller will display an EPG table having X rows and Y columns starting from row number P and column number Q.

At step 1840, the user interfaces with the EPG table by providing a focus navigation change. In one implementation, this occurs by the pressing of a defined focus navigation button (e.g., arrow up, arrow down, arrow right or arrow left). The navigation tool can be located on the DTV unit, or on a remote control device, or it could be virtual (e.g., on screen displayed).

At step 1850, the user selection is communicated to the target. In one implementation, step 1850 is realized using the command pass-through mechanism. In an alternate embodiment, the panel subunit communication architecture as described with respect to FIGS. 1-12, is used. Specifically, a user event within the panel subunit can be used to realize step 1850.

At step 1860 of FIG. 18, in response to focus navigation selection, the target updates the table GUI element descriptor. Particularly, if the focus navigation change calls for the EPG table to display another section of the complete EPG, then the target may have to modify the starting row number field and the starting column number field of the descriptor. It should be noted that, however, it may not be necessary for the target to modify the descriptor because the focus navigation change may not call for another section of the complete EPG to be displayed.

At step 1870, the controller reads the updated table GUI element descriptor, and displays an updated EPG table. In the present embodiment, steps 1840 to 1870 may be repeated for additional focus navigation changes.

It is appreciated that by using the table GUI element descriptor to define a table-like interface, the present invention provides an efficient way for a target to communicate a screen of information for display on a controller. It is particularly advantageous for the display of information that needs to be displayed in a particular arrangement (e.g., EPG information) and also when used in conjunction with controllers that do not have robust processing capabilities and those that may not have sufficient memory to store the complete EPG.

Focused Bitmap

The present invention provides a button GUI element descriptor that defines the appearance of a button element when displayed by a controller. Significantly, the button GUI element descriptor defines for a button element one bitmap to be displayed when out of focus and another bitmap to be displayed when the button element is in focus. In this way, the target would be able to control the focused design of the button.

FIG. 19 illustrates a particular implementation of a button GUI element descriptor 1900. In the present embodiment, button GUI element descriptor 1900 is maintained by computer readable memory units of a target (e.g., STB 856). As illustrated in FIG. 19, "descriptor_length" field 1902 contains the length of the button GUI element descriptor 1900. "List_type" field 1904 contains list type information for indicating to a controller that descriptor 1900 describes a button GUI element. "Attributes" field 1906 describes the attributes of the button GUI element. "Size_of_list_specific_information" field 1908 describes the size of the list specific information.

"Button_width" field 1910 and "button_height" field 1912 describe the dimensions (width and height) of the button to be displayed, and in one embodiment is being represented in screen coordinates. Button GUI element descriptor 1900 also includes an "optional_attributes_list" field 1914 describes an optional attributes list for the button GUI element. "Number_of_links(n)" field 1916 describes a number of links for each of the objects of the button GUI element.

Button GUI element descriptor 1900 of the present invention includes a "normal_label_link" field 1918 describes a released label link that points to a memory area storing the label for an object when it is not in focus during focus navigation. "Normal_bitmap_link" field 1920 describes a released bitmap link that points to a memory area storing the bitmap for the object when it is not in focus. Significantly, button GUI element descriptor 1900 of the present invention includes a "focused_label_link" field 1922 and a "focused_bitmap link" field 1924. "Focused_label_link" field 1922 describes a focused label link that points to a memory area storing the label for the object when it is focused during focus navigation. "Focused_bitmap_link" field 1924 describes a focused bitmap link that points to a memory area storing the bitmap for the object when it is focused. "Optional_link_list" field 1926 describes other optional link list for the object. In the present embodiment, each object of the button GUI element has its respective links.

Figure 20A:
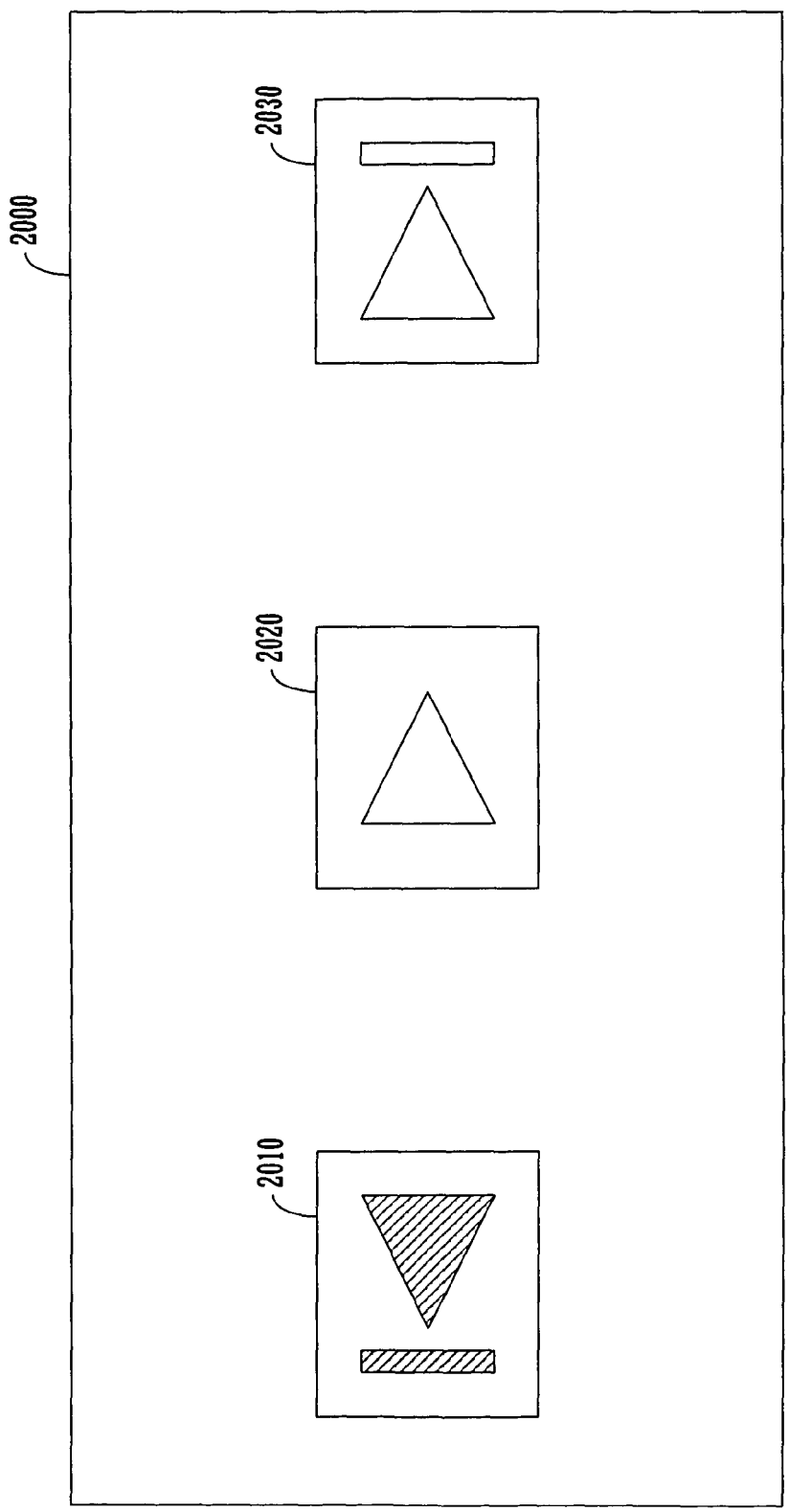
FIGS. 20A and 20B depict an exemplary panel subunit as displayed by a controller using button GUI element descriptors of the present embodiment.
Figure 20B:
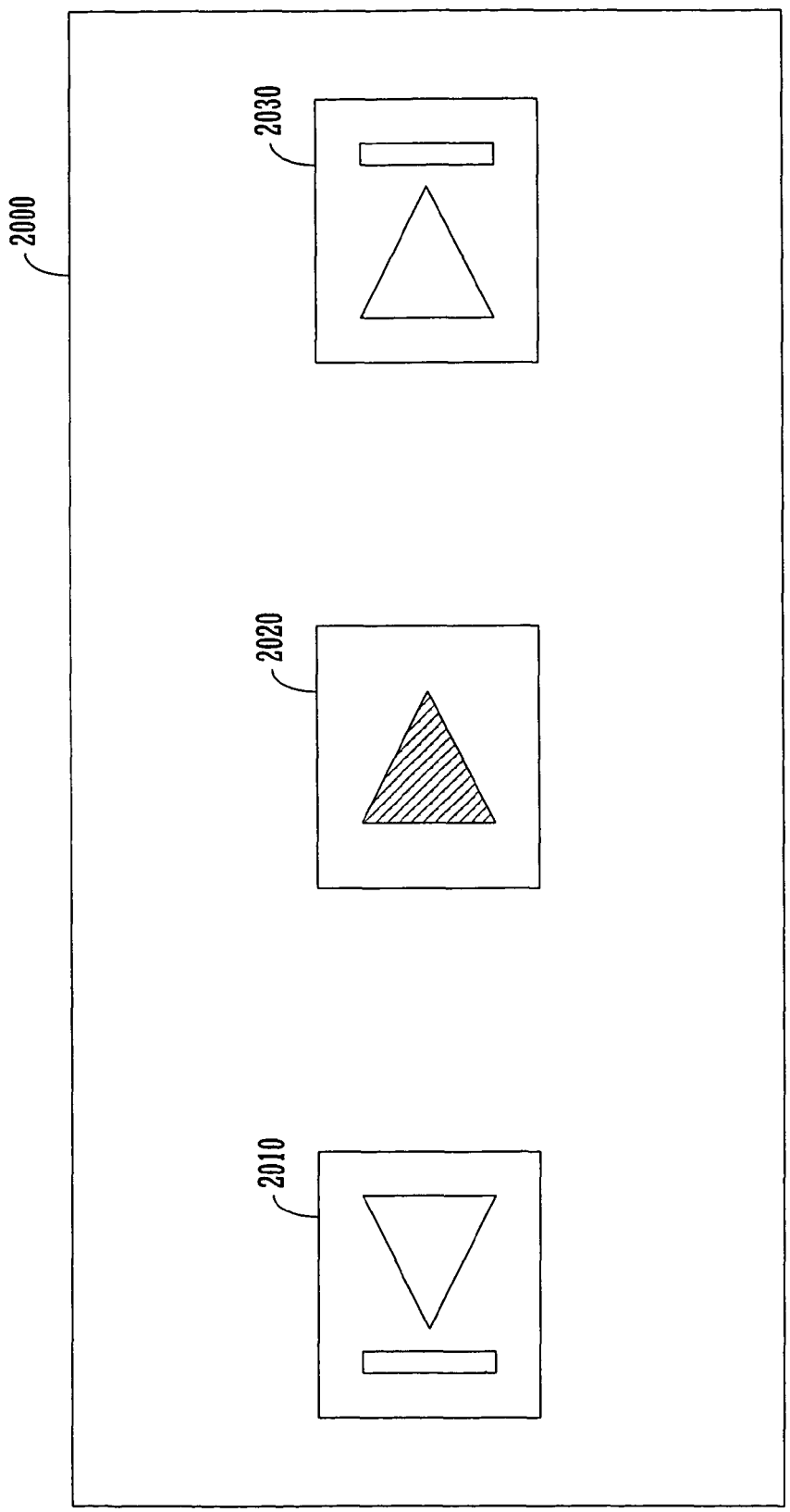

FIGS. 20A and 20B illustrate an exemplary panel subunit GUI 2000 as displayed by a controller (e.g., controller 852) using button GUI element descriptors of the present embodiment. As illustrated in FIG. 20A, button 2010 of the panel subunit 2000 is in focus and is displayed by the controller with a focused bitmap design. In the present embodiment, the focused bitmap design is defined by "focused_bitmap_link" field 1924 of button GUI element descriptor 1900. In FIG. 20A, buttons 2020 and 2030 of the panel subunit 2000, however, are not in focus and are displayed with a normal bitmap design. The normal bitmap design is defined by "normal_bitmap_link" field 1920 of the descriptor 1900.

In FIG. 20B, button 2010 is no longer in focus and button 2020 is in focus. Therefore, a normal bitmap is displayed for the button 2010 and a focused bitmap is displayed for button 2020. Because the button GUI element descriptor 1900 includes a normal bitmap link and a focused bitmap link, the target would be able to have more control over how a button element would appear on the controller. Additionally, a rich graphical user interface would be achievable even on a controller with limited capabilities.

Default Focus

One embodiment of the present invention provides a panel GUI element descriptor that includes a focused identifier attribute indicating a pre-determined element of the panel subunit GUI as default focus. In this way, the target would be able to control the default focus of the panel subunit GUI when displayed by a controller. In addition, in certain cases, the controller may display meaningful information only when a default focus has been pre-determined.

FIG. 21 illustrates a particular implementation of a panel GUI element descriptor 2100. In the present embodiment, panel GUI element descriptor 2100 is maintained by computer readable memory units of a target (e.g., STB 856). As illustrated in FIG. 21, "descriptor_length" field 2102 contains the length of the panel GUI element descriptor 2100. "List_type" field 2104 contains list type information for indicating to a controller that descriptor 2100 describes a panel GUI element. "Attributes" field 2106 describes the attributes of the panel GUI element. "Size_of_list_specific_information" field 2108 describes the size of the list specific information. "Aspect_ratio" field 2110 describes the aspect ratio (e.g., ratio between height and width) of the panel GUI to be displayed. Panel GUI element descriptor 2100 also includes an "optional_attributes_list" field 2114 describes an optional attributes list for the panel GUI element. "Number_of_links (n)" field 2116 describes a number of links for each of the objects of the panel GUI element. Panel GUI element descriptor 2100 may include other fields for storing other attributes of the panel GUI element.

Significantly, panel GUI element descriptor 2100 of the present invention includes a "focused_id" field 2112 for storing an identifier identifying a particular element (e.g., button) as a default focus. In accordance with the present embodiment, panel GUI element descriptor 2100 defines a panel GUI to be displayed, and causes the controller displaying the panel GUI to display the designated button as the default focus.

Figure 22A:
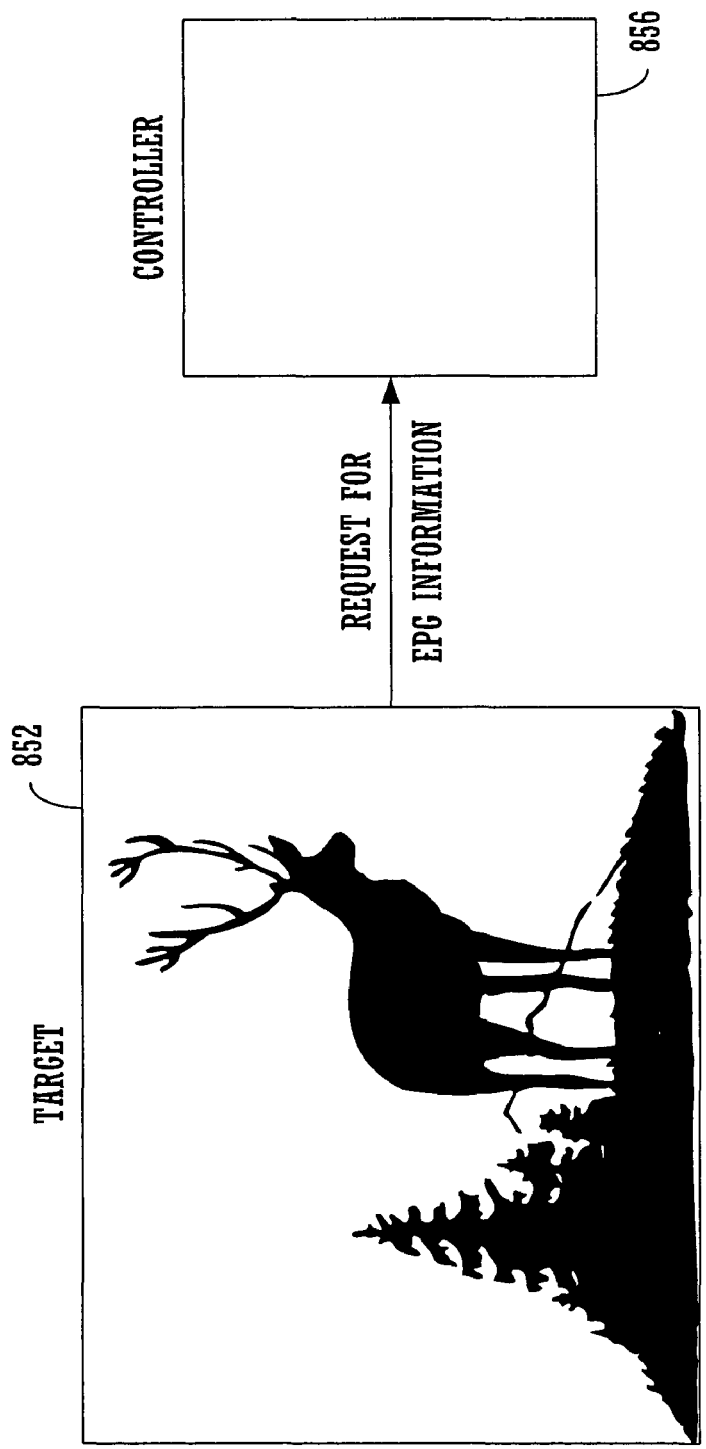
FIGS. 22A and 22B illustrate data flow between a controller and a target of a network using the panel GUI element descriptor of the present embodiment.
Figure 22B:
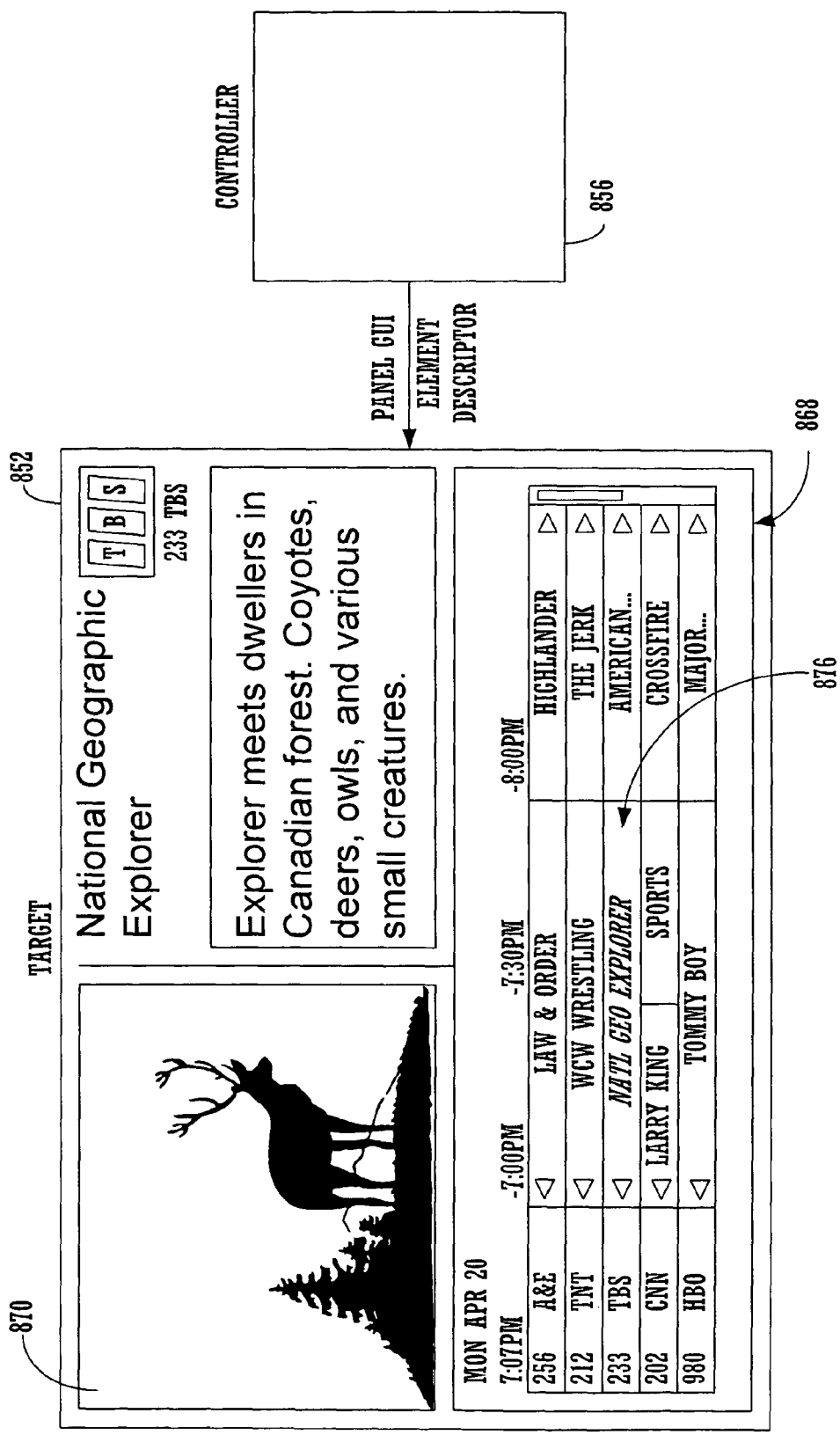

FIGS. 22A and 22B illustrate data flow between controller 852 and target 856 of network 850 using the panel GUI element descriptor in accordance with the present embodiment. As shown by FIG. 22A, in response to a user selecting the "GUIDE" button 866d (FIG. 13) on a remote control device 866, for instance, a command pass-through code 876c is forwarded to the target 856 (e.g., using the 1394 asynchronous connection) which recognizes this command as a request for the display of EPG information. It is appreciated that any of a number of different mechanisms can be used to signal a request for EPG information and the command pass-through mechanism shown in FIG. 22A is just one example.

As shown in FIG. 22B, the target 856 then forwards the controller an EPG panel GUI element which is displayed on a screen of the controller 852. The EPG panel GUI element 868 has a default focus selection according to the "focused_id" attribute of the panel GUI element descriptor 2100. The default focus selection ("default focus") is 876, "National Geographic." After the EPG panel GUI is displayed, a user may then select other elements of the EPG via a focus navigation change, e.g., selection of the up button 866a (FIG. 13).

Also shown in FIG. 22B is decimated video 870 that corresponds to the channel to which the target 856 is tuned before EPG 868 is displayed. The decimated video 870 also corresponds to the default focus selection 876. Without using the default focus identifier attribute of the present embodiment, the focus of the EPG table may be arbitrarily determined by the controller and may bear no correlation to the video signals that target 856 is sending the controller. This disadvantage is overcome by using the default focus selection mechanism of the present embodiment. By defining the default focus, the target would be able to determine which object of the panel GUI is in focus when the panel GUI is initially generated. In this way, the controller would be able to display meaningful information and provide a rich graphical user interface.

Font Style Attributes for Text Element

Another embodiment of the present invention provides a text GUI element descriptor that includes a font style attribute dictating whether the text GUI element should be displayed as bold, underlined and/or reversed. In this way, the target device would be able to exercise more control over the "look-and-feel" of the GUI as displayed by the controller device such that more sophisticated GUIs can be realized.

FIG. 23 illustrates a particular implementation of a text GUI element descriptor 2300. In the present embodiment, text GUI element descriptor 2300 is maintained by computer readable memory units of a target (e.g., STB 856). As illustrated in FIG. 23, "descriptor_length" field 2302 contains the length of the text GUI element descriptor 2300. "List_type" field 2304 contains list type information for indicating to a controller that descriptor 2300 describes a text GUI element. "Attributes" field 2306 describes the attributes of the text GUI element. "Size_of_list_specific_information" field 2308 describes the size of the list specific information.

"Text_height" field 2310 and "text_width" field 2312 describe the dimensions of the text element to be displayed and may be expressed in screen coordinates. Text GUI element descriptor 2300 also includes an "optional_attributes_list" field 2322 that describes an optional attributes list for the text GUI element. "Number_of_links(n)" field 2324 describes a number of links for the text GUI element. Text GUI element descriptor 2300 may include other fields for storing other attributes of the text GUI element.

Significantly, text GUI element descriptor 2300 of the present embodiment includes a "bold" field 2316, an "underline" field 2318 and a "reverse" field 2320 for storing attributes that define the style of the text GUI element to be displayed.

Figure 24:
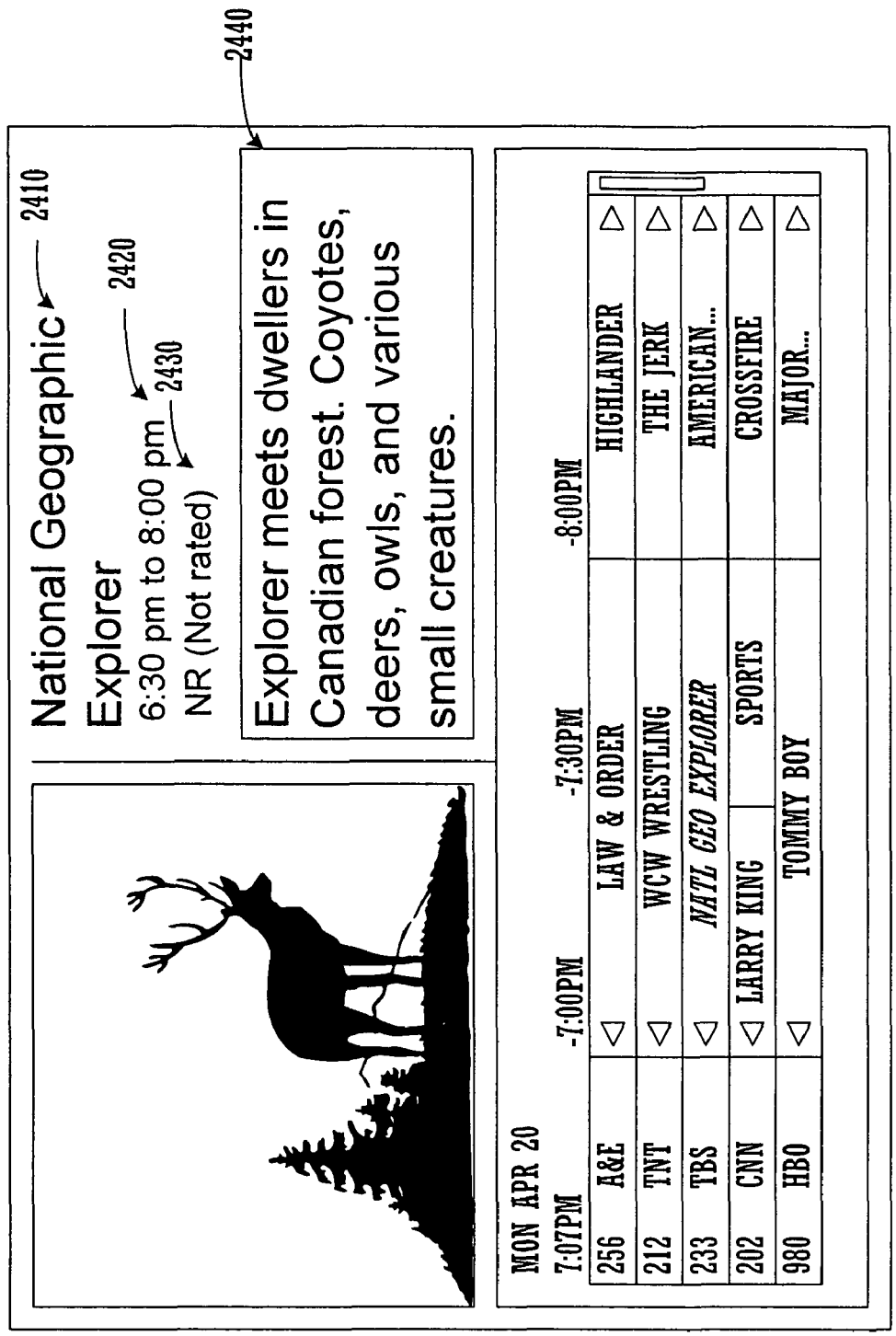
FIG. 24 is a depiction of an exemplary electronic program guide (EPG) displayed by a controller device in accordance with an embodiment of the present invention.

FIG. 24 illustrates an exemplary EPG 2400 defined by descriptors that include text GUI element descriptor 2300 and displayed by controller 852 in accordance with an embodiment of the present invention. As shown in FIG. 24, EPG 2400 includes bolded characters 2410, underlined characters 2420, underlined and bolded characters 2430 and reversed characters 2440. Bolded characters 2410 are brought about by using the "bold" field 2316 of the text GUI element descriptor. Underlined characters 2420 are brought about using the "underlined" field 2318 of the text GUI element descriptor. Bolded and underlined characters 2430 are brought about using the "bold" field 2316 and "underlined" field 2318. Reversed characters 2449 (e.g., characters that are displayed with the foreground and background colors reversed) are brought about by using the "reverse" field 2320. It should be appreciated that, in accordance with the present embodiment, many different combinations of bold, underline and reverse can also be used.

The preferred embodiments of the present invention, extended elements and mechanisms for providing a rich user interface in panel subunit, have thus been described. While the present invention has been described in particular embodiments, it should be appreciated that the present invention should not be construed as limited by such embodiments, but rather construed according to the below claims.

What is claimed is:

1. A controller comprising:
    a) a processor; and
    b) a memory comprising instructions that when executed on said processor implement a method of processing information, said method comprising:
        monitoring a network to discover a target device coupled to said network;
        receiving a table GUI element descriptor from said target device, wherein said table GUI element descriptor defines a matrix that includes vertically and horizontally aligned information, and wherein said table GUI element descriptor further defines an on-screen display for displaying a portion of said matrix;
        generating data for display representing said on-screen display according to said table GUI element descriptor; and
        updating displayed data responsive to a state change of said target device.

2. A controller as recited in claim 1 wherein said table GUI element descriptor comprises:
    a first attribute corresponding to a total number of columns of said matrix; and
    a second attribute corresponding to a total number of rows of said matrix.

3. A controller as recited in claim 2 wherein said table GUI element descriptor comprises:
    a third attribute corresponding to a number of columns of said matrix to be displayed by said on-screen display; and
    a fourth attribute corresponding to a number of rows of said matrix to be displayed by said on-screen display.

4. A controller as recited in claim 3 wherein said table GUI element descriptor comprises:
    a fifth attribute corresponding to a column number of a first column of said on-screen display; and
    a sixth attribute corresponding to a row number of a first row of on-screen display.

5. A controller as recited in claim 1 wherein said on-screen display comprises an electronic program guide (EPG).

6. A controller as recited in claim 1 wherein said processor and said memory are integrated within a set-top box unit.

7. A controller as recited in claim 6 further comprising a display unit coupled to said set-top-box unit, said display unit operable to receive said data for display and wherein said display unit is operable to display said on-screen display.

8. A controller as recited in claim 6 wherein said target device is remote to said set-top-box unit and wherein said set-top-box unit is operable to communicate with said target device via a digital network connection.

* * * * *